(12) United States Patent
Smith et al.

(10) Patent No.: US 8,406,409 B2
(45) Date of Patent: *Mar. 26, 2013

(54) TREATMENT OF ELECTRONIC COMMUNICATIONS BASED ON USER ASSOCIATION WITH ONE OR MORE ONLINE GROUPS

(75) Inventors: Michael Smith, Halifax (CA); Michael Connelly, Philadelphia, PA (US)

(73) Assignee: Marathon Solutions, LLC, Kirkland, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/345,191

(22) Filed: Jan. 6, 2012

(65) Prior Publication Data

US 2012/0106725 A1 May 3, 2012

Related U.S. Application Data

(63) Continuation of application No. 11/688,065, filed on Mar. 19, 2007, now Pat. No. 8,094,800, which is a continuation-in-part of application No. 11/016,962, filed on Dec. 21, 2004, now Pat. No. 7,894,588.

(60) Provisional application No. 60/862,328, filed on Oct. 20, 2006, provisional application No. 60/882,824, filed on Dec. 29, 2006.

(51) Int. Cl.
H04M 3/42 (2006.01)
(52) U.S. Cl. .............................. 379/210.02; 379/211.01
(58) Field of Classification Search . 379/210.02–214.01
See application file for complete search history.

(56) References Cited

U.S. PATENT DOCUMENTS

| | | | |
|---|---|---|---|
| 4,852,151 | A | 7/1989 | Dittakavi |
| 4,873,719 | A | 10/1989 | Reese |
| 4,876,711 | A | 10/1989 | Curtin |
| 4,947,421 | A | 8/1990 | Toy |
| 4,965,459 | A | 10/1990 | Murray |
| 4,969,184 | A | 11/1990 | Gordon |
| 4,995,074 | A | 2/1991 | Goldman |

(Continued)

FOREIGN PATENT DOCUMENTS

| | | |
|---|---|---|
| EP | 07 328 35 | 9/1996 |
| WO | WO 96/09714 | 3/1996 |

(Continued)

OTHER PUBLICATIONS

Anonymous: "Does the Internet Have Call Waiting?", Internet Document, [Online] Copyright 2002, Tech TV, Inc., pp. 1-2, Retrieved from the Internet: www.techtv.com/screensavers/print/0,23102,2256423,00.html, [retrieved on Nov. 1, 2004].

(Continued)

Primary Examiner — Simon Sing
Assistant Examiner — Solomon Bezuayehu
(74) Attorney, Agent, or Firm — Lee & Hayes, PLLC

(57) ABSTRACT

A method is described for call treatment based on user association with one or more user groups. The method includes receiving a phone call from a call source that is directed to a call recipient, identifying a user group associated with the call recipient, and determining a number of received indications assigned to the user group. The received indications are assigned to the user group by users associated with the user group, and the received indications reflect a desire by the users for a special treatment of future calls from the call source. The method also includes distinguishing treatment of the phone call from the call source based on the number of received indications.

25 Claims, 27 Drawing Sheets

U.S. PATENT DOCUMENTS

| | | | |
|---|---|---|---|
| 5,046,188 A | 9/1991 | Molnar | |
| 5,195,130 A | 3/1993 | Weiss | |
| 5,263,084 A | 11/1993 | Chaput | |
| 5,287,401 A | 2/1994 | Lin | |
| 5,309,512 A | 5/1994 | Blackmon | |
| 5,329,578 A | 7/1994 | Brennan et al. | |
| 5,343,516 A | 8/1994 | Callele | |
| 5,363,431 A | 11/1994 | Schull | |
| 5,375,161 A | 12/1994 | Fuller et al. | |
| 5,425,092 A | 6/1995 | Quirk | |
| 5,425,097 A | 6/1995 | Pula | |
| 5,432,616 A | 7/1995 | Fukao | |
| 5,457,797 A | 10/1995 | Butterworth | |
| 5,463,683 A | 10/1995 | Collins et al. | |
| 5,475,746 A | 12/1995 | Miller | |
| 5,491,744 A | 2/1996 | Kikinis | |
| 5,495,521 A | 2/1996 | Rangechar | |
| 5,502,759 A | 3/1996 | Cheng et al. | |
| 5,513,251 A | 4/1996 | Rochkind | |
| 5,519,767 A | 5/1996 | O'Horo | |
| 5,524,145 A | 6/1996 | Parker | |
| 5,533,102 A | 7/1996 | Robinson | |
| 5,533,110 A | 7/1996 | Pinard | |
| 5,535,260 A | 7/1996 | Zicker | |
| 5,537,467 A | 7/1996 | Cheng et al. | |
| 5,548,636 A | 8/1996 | Bannister et al. | |
| 5,557,659 A | 9/1996 | Hyde-Thomson | |
| 5,581,596 A | 12/1996 | Hogan | |
| 5,604,796 A | 2/1997 | Yamazaki | |
| 5,608,786 A | 3/1997 | Gordon | |
| 5,610,910 A | 3/1997 | Focsaneanu | |
| 5,633,919 A | 5/1997 | Hogan et al. | |
| 5,651,054 A | 7/1997 | Dunn et al. | |
| 5,651,060 A | 7/1997 | Cohn | |
| 5,706,336 A | 1/1998 | Kikinis | |
| 5,805,587 A | 9/1998 | Norris et al. | |
| 5,809,128 A | 9/1998 | McMullin | |
| 5,848,134 A | 12/1998 | Sekiguchi et al. | |
| 5,894,504 A | 4/1999 | Alfred et al. | |
| 5,999,525 A | 12/1999 | Krishnaswamy | |
| 6,023,723 A | 2/2000 | McCormick et al. | |
| 6,125,113 A | 9/2000 | Farris et al. | |
| 6,128,304 A | 10/2000 | Gardell | |
| 6,144,671 A | 11/2000 | Perinpanathan | |
| 6,157,648 A | 12/2000 | Voit | |
| 6,195,357 B1 | 2/2001 | Polcyn | |
| 6,215,857 B1 | 4/2001 | Kasiviswanathan | |
| 6,240,449 B1 | 5/2001 | Nadeau | |
| 6,243,373 B1 | 6/2001 | Turock | |
| 6,256,612 B1 | 7/2001 | Vo | |
| 6,295,341 B1 | 9/2001 | Muller | |
| 6,301,609 B1 | 10/2001 | Aravamudan et al. | |
| 6,304,565 B1 | 10/2001 | Ramamurthy | |
| 6,304,637 B1 | 10/2001 | Mirashrafi | |
| 6,400,812 B1 | 6/2002 | Svedberg | |
| 6,421,339 B1 | 7/2002 | Thomas | |
| 6,421,709 B1 | 7/2002 | McCormick et al. | |
| 6,463,145 B1 | 10/2002 | O'Neal et al. | |
| 6,477,246 B1 | 11/2002 | Dolan et al. | |
| 6,487,196 B1 | 11/2002 | Verthein | |
| 6,490,275 B1 | 12/2002 | Sengodan | |
| 6,496,501 B1 | 12/2002 | Rochkind et al. | |
| 6,549,619 B1 | 4/2003 | Bell et al. | |
| 6,618,600 B1 | 9/2003 | Chow et al. | |
| 6,625,258 B1 | 9/2003 | Ram | |
| 6,671,365 B2 | 12/2003 | Kemppainen | |
| 6,738,461 B2 | 5/2004 | Trandal et al. | |
| 6,804,224 B1 | 10/2004 | Schuster et al. | |
| 6,856,612 B1 | 2/2005 | Bjelland | |
| 6,879,677 B2 | 4/2005 | Trandal | |
| 6,954,454 B1 | 10/2005 | Schuster et al. | |
| 6,968,174 B1 | 11/2005 | Trandal | |
| 6,987,756 B1 | 1/2006 | Ravindranath et al. | |
| 6,990,187 B2 | 1/2006 | MacNamara et al. | |
| 7,039,395 B2 | 5/2006 | Kundaje et al. | |
| 7,085,358 B2 | 8/2006 | Ruckart | |
| 7,103,167 B2 | 9/2006 | Brahm | |
| 2001/0006519 A1 | 7/2001 | Voit | |
| 2002/0012426 A1 | 1/2002 | Gupton | |
| 2002/0196913 A1 | 12/2002 | Ruckart | |
| 2003/0002476 A1 | 1/2003 | Chung | |
| 2003/0133558 A1 | 7/2003 | Kung et al. | |
| 2003/0156700 A1 | 8/2003 | Brown et al. | |
| 2004/0114747 A1* | 6/2004 | Trandal et al. | 379/211.02 |
| 2004/0174965 A1 | 9/2004 | Brahm | |
| 2004/0213396 A1 | 10/2004 | MacNamara et al. | |
| 2004/0234062 A1 | 11/2004 | Jones | |
| 2005/0080856 A1* | 4/2005 | Kirsch | 709/206 |
| 2005/0117730 A1 | 6/2005 | Mullis et al. | |
| 2005/0207557 A1 | 9/2005 | Dolan | |
| 2005/0271196 A1 | 12/2005 | Florkey et al. | |
| 2006/0126806 A1 | 6/2006 | Trandal | |
| 2006/0126820 A1 | 6/2006 | Trandal | |
| 2006/0142012 A1 | 6/2006 | Kirchhoff | |
| 2006/0168574 A1 | 7/2006 | Giannini | |
| 2006/0227766 A1 | 10/2006 | Mickle | |
| 2006/0227957 A1 | 10/2006 | Dolan | |
| 2006/0250997 A1 | 11/2006 | Smith | |
| 2008/0133682 A1* | 6/2008 | Chadwick et al. | 709/206 |
| 2010/0226261 A1 | 9/2010 | Piche | |
| 2012/0117173 A1* | 5/2012 | Hallam-Baker | 709/206 |

FOREIGN PATENT DOCUMENTS

| | | |
|---|---|---|
| WO | WO 96/20553 | 7/1996 |
| WO | WO 96/38018 | 11/1996 |
| WO | WO 97/20424 | 6/1997 |
| WO | WO 98/15143 | 4/1998 |
| WO | WO 99/31862 | 6/1999 |
| WO | WO 00/60809 | 10/2000 |

OTHER PUBLICATIONS

Anonymous: "Did Someone Just Call You?", Internet Document, [Online] Copyright 2002, CallWave, Inc., p. 1, Retrieved from the Internet: www.callwave.com, [retrieved on Nov. 1, 2004].

Anonymous: "Internet Answering Machine™ Software", Internet Document, [Online] Copyright 2002, CallWave, Inc., pp. 1-2, Retrieved from the Internet: www.callwave.com/findoutmore.asp?ct=hpl_fom, [retrieved on Nov. 1, 2004].

Rick James: "Finally! Interactive 'Call Waiting' While You're Surfing?", Internet Document, [Online], pp. 1-4, Retrieved from the Internet: www.monitor.ca/monitor/issues/vol4iss12/feature7.html, [retrieved on Dec. 21, 2004].

International Search Report, Application Serial No. PCT/US05/45664, dated Sep. 21, 2006, 12 pages.

IMB Technical Disclosure Bulletin, vol. 37, No. 9, pp. 101-104, Sep. 1994.

IEEE Nov. 1989, Tencon '89, pp. 10-13, Shankar et al.

IEEE Jan. 1993, Communications Magazine, pp. 15-19, Burson et al.

Lawton, George, "Paving the Information Superhighway's Last Mile," Apr. 1998; pp. 10-12 and 14.

Office Actions from U.S. Appl. No. 09/567,758 dated Aug. 8, 2003, Apr. 14, 2004, May 20, 2004, Aug. 15, 2005, Apr. 5, 2006, and Jan. 22, 2007.

Office Action from corresponding Canadian Application No. 2,304,353, dated Apr. 19, 2006 (5 pages).

Office Action from U.S. Appl. No. 10/221,784 dated Apr. 8, 2005.

Reindle, Mark E., "Method and Apparatus for Returning a False Special Information Tone for an Incoming Telephone Call," 6 pages, May 17, 2007, http://www.google.com/patents?id=rdYOAAAAEBAJ&dq=inassignee:Royla+inassignee: . . . .

* cited by examiner

FIG. 2
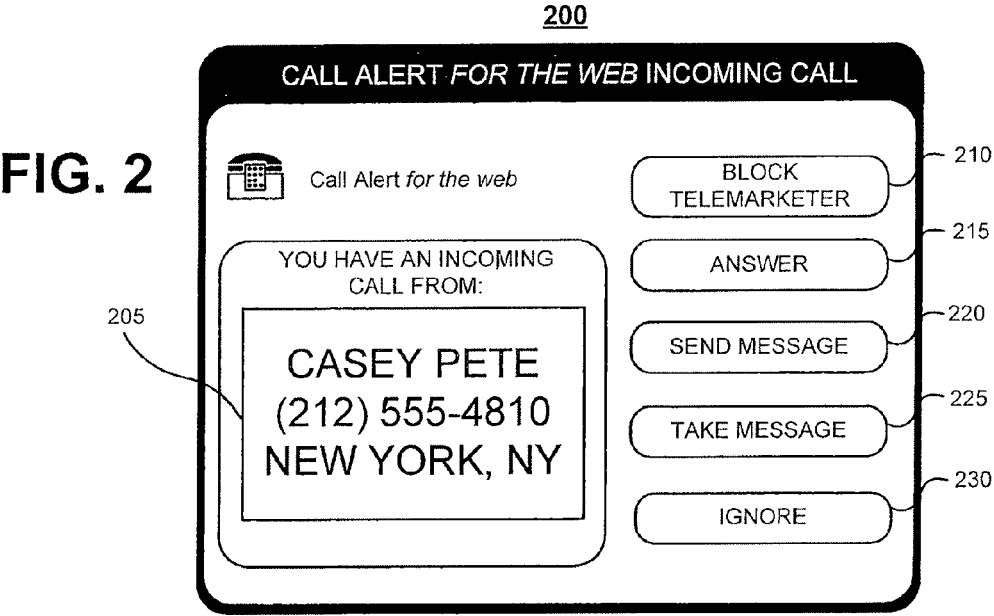
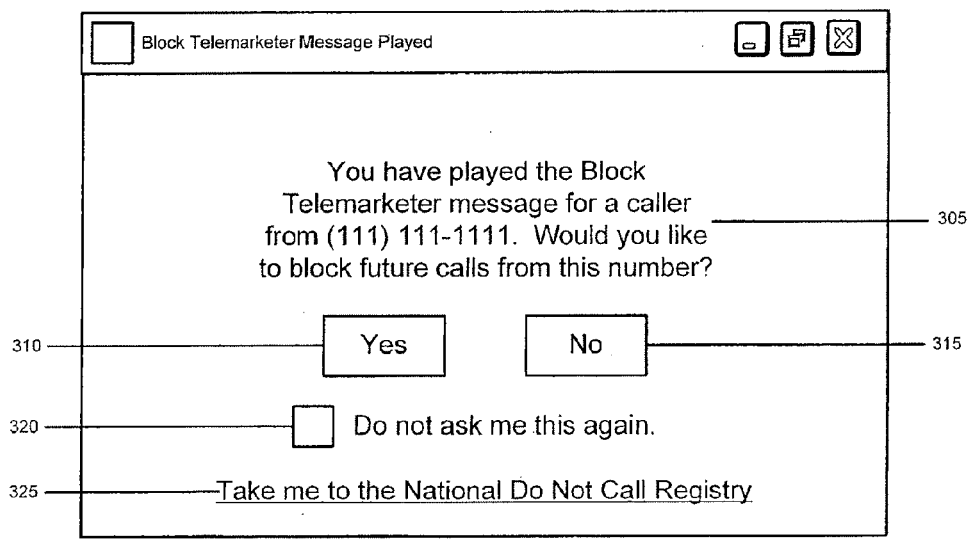
FIG. 3

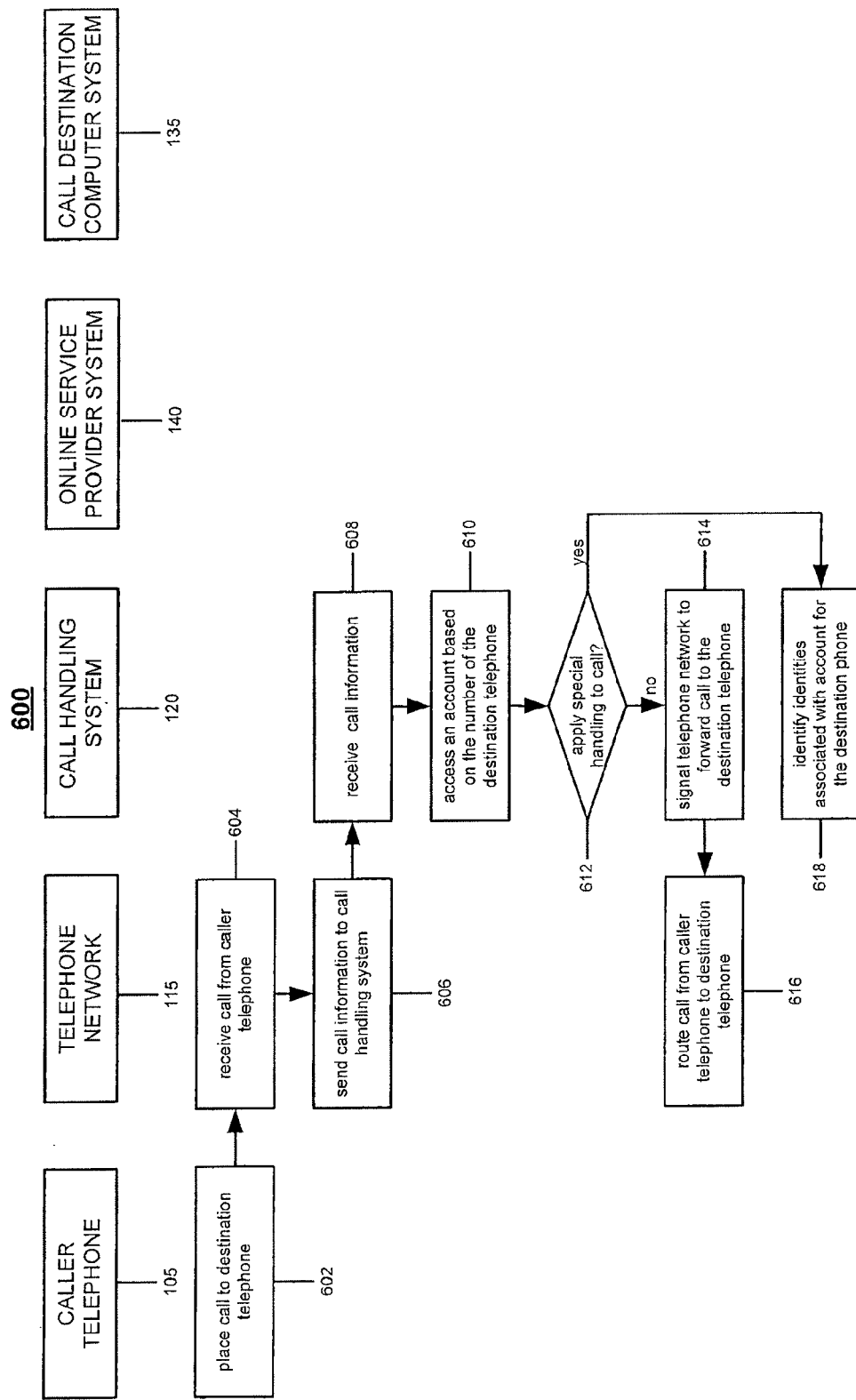

800

Privacy

Who can contact me
- 805 — ● Allow all callers to contact me
- 810 — ○ Allow only callers in my Address Book
- 815 — ○ Allow only the callers listed below
- 820 — ○ Block only the callers listed below (You may enter up to 25 phone numbers in each list below)

Allow List — 825
| | |
|---|---|
| SurfinDiane | 703-555-1212 |
| Netscape Comm | 650-937-1111 |
| Parker, Peter | 902-832-5555 |
| Kent, Clark | 614-538-2200 |

Block List — 830
| | |
|---|---|
| AA Desk Help | 703-555-1212 |
| Bingen | 650-937-1111 |
| Derek H | 902-832-5555 |
| dialpaD | 614-538-2200 |

- 835: Add Name
- 840: Remove
- 845: Add Name
- 850: Remove

Block/Allow Time Range:

Start: Day: Sun. | Hour: 12 AM (855) | Minute: 00 (865)
End: Day: Sun. (870) | Hour: 12 AM (875) | Minute: 00 (880)

Hour Start: 860

- 885 — ☐ Apply to calls to me
- 890 — ☐ Apply to calls to members of my buddy list
- 895 — ☐ Apply to all users

FIG. 8

1000B
PERSONAL PREFERENCE
TABLE FOR THE FIRST CALL
RECIPIENT

| CALL SOURCE | TREATMENT PREFERENCE |
|---|---|
| (212) 555-1810 | BLOCK (BETWEEN 8 AM AND 5 PM) |
| (202) 625-6050 | IGNORE |

FIG. 10B

1000C
A MASTER TABLE ASSOCIATED WITH
PLURALITY OF USER GROUPS

| USER GROUPS | USERS | TREATMENT PREFERENCE | TOTAL NUMBER OF VOTES ASSOCIATED WITH EACH CALL SOURCE |
|---|---|---|---|
| FIRST USER GROUP | FIRST CALL RECIPIENT | (1) BLOCK CALLS FROM (212) 555-4810<br>(2) IGNORE CALLS FROM (202) 625-6050 | 1 NEGATIVE VOTE ASSOCIATED WITH (212) 555-4810<br><br>1 NEGATIVE VOTE ASSOCIATED WITH (202) 555-2010<br><br>2 NEGATIVE VOTES ASSOCIATED WITH (202) 625-6050 |
| | SECOND CALL RECIPIENT | (1) BLOCK CALLS FROM (202) 625-6050<br>(2) IGNORE CALLS FROM (212) 555-2010 | |
| SECOND USER GROUP | FIRST CALL RECIPIENT | (1) BLOCK CALLS FROM (212) 555-4810<br>(2) IGNORE CALLS FROM (202) 625-6050 | 1 NEGATIVE VOTE ASSOCIATED WITH (202) 625-6050<br><br>1 NEGATIVE VOTE ASSOCIATED WITH (832) 444-5454<br><br>2 NEGATIVE VOTES ASSOCIATED WITH (212) 555-4810 |
| | THIRD CALL RECIPIENT | (1) BLOCK CALLS FROM (832) 444-5454<br>(2) IGNORE CALLS FROM (212) 555-4810 | |

```
┌─────────────────────────────────────────────┐
│               PREFERENCE                    │
│                                             │
│    ☐   ASSIGN THE INDICATION TO ALL OF      │
│        MY USER GROUPS                       │
│                                             │
│    ☐   ASSIGN THE INDICATION TO ONE OR      │
│        MORE OF MY USER GROUPS               │
│                                             │
│    ☐   DEFAULT SETTING                      │
│                                             │
└─────────────────────────────────────────────┘
```

FIG. 11B

TREATMENT OF ELECTRONIC COMMUNICATIONS BASED ON USER ASSOCIATION WITH ONE OR MORE ONLINE GROUPS

CROSS REFERENCE TO RELATED APPLICATIONS

The present application is a continuation of U.S. patent application Ser. No. 11/688,065, filed Mar. 19, 2007 (now allowed) now U.S. Pat. No. 8,094,800, which is a continuation in part of U.S. application Ser. No. 11/016,962, filed Dec. 21, 2004 (now U.S. Pat. No. 7,894,588), which claims priority from U.S. Provisional Application Ser. No. 60/862,328, filed Oct. 20, 2006, and U.S. Provisional Application No. 60/882,824, filed Dec. 29, 2006. The contents of all of the above-listed applications are expressly incorporated herein by reference to their entireties.

TECHNICAL FIELD

This application relates to call treatment based on user association with one or more user groups.

BACKGROUND

Telephone call recipients may block calls from undesirable call sources, such as telemarketers, on a national or on an individual level. For example, calls from call sources nationally recognized as typically undesirable may be blocked for call recipients that are registered with the National Do Not Call Registry. The National Do Not Call Registry blocks calls from the recognized call sources to all registered call recipients. The call recipients may add call sources to the National Do Not Call Registry, which results in calls from the added call sources being blocked for all registered recipients. In addition, an individual recipient may specify call sources whose calls are blocked only for the individual recipient.

DESCRIPTION OF DRAWINGS

FIG. 2 is an illustration of a notification of an incoming telephone call.

FIG. 3 is an illustration of a notification of a blocked telephone call from a telemarketer.

FIGS. 6A-6C provide a flow chart of a process for handling a call to a user for whom calls from undesirable sources are handled specially.

FIG. 8 is an illustration of an interface for manually specifying a list of call sources for which calls are specially handled.

FIG. 10B illustrates an exemplary personal preference table associated with a call recipient.

FIG. 10C illustrates an exemplary master table associated with a plurality of user groups.

FIG. 11B illustrates an exemplary user interface that may be presented to a user, allowing the user to identify one or more user groups.

DETAILED DESCRIPTION

Figure 1:
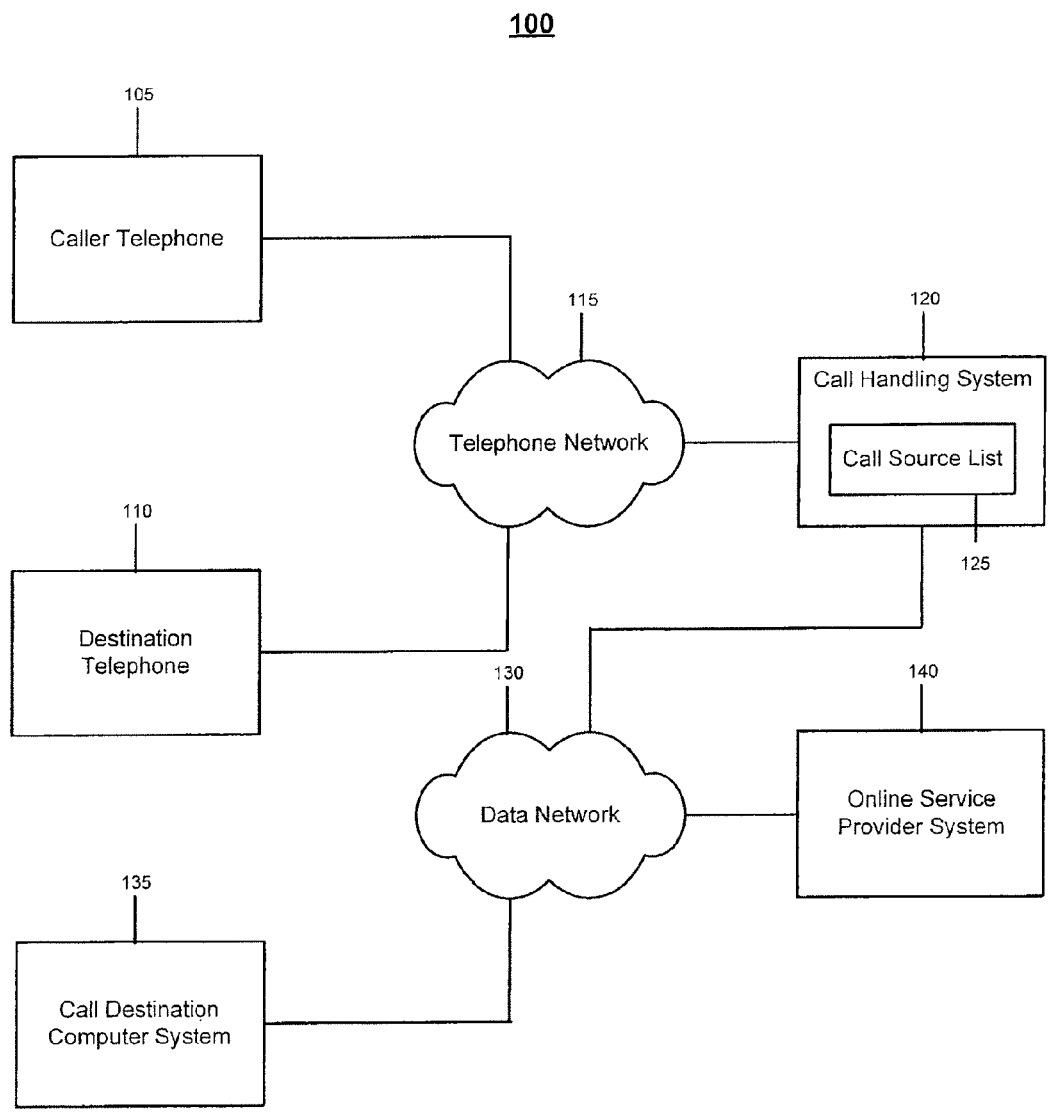
FIG. 1 is a block diagram of a communications system for providing a telephone call handling list for multiple users.

In one implementation, a call handling system allows a call recipient to cast a vote against a particular call source. The vote may reflect a desire for special treatment of present and future calls from the call source. The special treatment may include special presentation and/or special handling. The special handling may include preventing the future calls from the call source to reach the call recipient. Alternatively, the special handling may include ignoring future calls from the call source or forwarding future calls from the call source to a particular client device (e.g., a voice mail device). The special treatment also may include special presentation of future calls from the call source. The special presentation may include presenting the call with a distinctive color and/or presenting the call with information regarding the total number of votes received against the call source. In another implementation, the call recipient may cast a vote for, rather than against, the particular call source. In this implementation, the vote is a positive vote indicating, for example, that the call source is trusted. Special handling of trusted call sources may include forwarding the call directly to a preferential client device (e.g., personal cell phone).

In addition, the call handling system allows the call recipient to apply the call recipient's vote to one or more user groups associated with the call recipient. The user groups associated with the call recipient include, for example, the user's buddy list, the user's family, groups related to the user's interests or hobbies (e.g., the hunter's enthusiast club and members of a forum or bulletin board associated with skiing), groups related to the user's profession (e.g., Michigan Bar Association), groups related to the user's political affiliation (e.g., Young Republicans of Virginia) and groups related to the user's work (e.g., project team groups). To this end, the call handling system may provide the call recipient with a user interface ("UI") that includes a triggering tool (e.g., an icon), allowing the call recipient to selectively assign the call recipient's vote to one or more user groups associated with the call recipient. In this manner, the call recipient may direct the call handling system to utilize the vote for other users within the one or more user groups.

The call handling system may keep track of the number of votes corresponding to the call source within various user groups and, based on the number of votes corresponding to the call source, the call handling system may determine how to treat an incoming call from the call source that is directed to a user that is a member of or associated with a user group. As such, the user to which the call is directed may take advantage of this special treatment regardless of whether or not the user has previously received calls from the call source.

In one specific example, a call source places a call to a call recipient, and the call handling system identifies a user group to which the call recipient belongs and accesses the number of votes cast against the call source and assigned to the user group by members of the user group who have previously received calls from the call source. The votes (or indications) reflect the members' desire for special treatment of future calls from the call source. Based on the number of votes, the call handling system determines how to treat the incoming call from the call source to the call recipient. The special treatment of the incoming call by the call handling system may include handling the call and/or presenting the call to the call recipient in a manner that varies based on the number of votes.

The call handling system may vary the call handling based on the number of votes, by, for example: (1) allowing the call to reach the call recipient if the number of votes (or indications) against the call source does not exceed a first threshold; (2) forwarding the call directly to voice mail if the number of votes (or indications) against the call source exceeds the first threshold but does not exceed a second threshold; and (3) preventing the call from reaching the call recipient if the number of votes (or indications) against the call source exceeds the second threshold.

The call handling system may vary the presentation of the call based on the number of votes by, for example: (1) using a first presentation style (e.g., the call source name is shown in green and/or a first ring tone is used) for the call notification if the number of votes is less than a first threshold; (2) using a second presentation style (e.g., the call source name is shown in yellow and/or a second ring tone is used) if the number of votes exceeds the first threshold but does not exceed a second threshold; and (3) using a third presentation style (e.g., the call source name is shown in red and/or a third ring tone is used) if the number of votes exceeds the second threshold. The call handling system also may choose not to present the call at all to the call recipient if, for example, the number of votes against the call source is exceptionally high.

Referring to FIG. 1, a communications system 100 for handling calls from undesirable call sources includes a caller telephone 105, a destination telephone 110, a telephone network 115, a call handling system 120 that includes a call source list 125, a network 130, an online service provider system 140, and a call destination computer system 135.

The caller telephone 105 is configured to place a call to the destination telephone 110 across the telephone network 115. The caller telephone 105 and the destination telephone 110 may be landline phones that allow communications over the telephone network 115. In another implementation, the caller telephone 105 and/or the destination telephone 110 may be a cellular phone or a mobile personal digital assistant (PDA) with embedded cellular phone technology. In yet another implementation, the destination telephone 110 may integrate the call destination computer system 135 and operate as a single computer system.

The telephone network 115 is configured to enable direct or indirect voice communications between the caller telephone 105, the destination telephone 110, and the call handling system 120. The telephone network 115 also may be configured to forward calls between the caller telephone 105 and the destination telephone 110 to a voicemail system, another telephone used by a user of the caller telephone 105 or the destination telephone 110, or another telephone system that may receive the calls. When a user of the caller telephone 105 places a call to the destination telephone 110, the telephone network 115 is configured to forward the call to the call handling system 120. In one implementation, forwarding the call to the call handling system 120 may include sending information describing the call to the call handling system. More particularly, sending information describing the call may include routing a signaling channel of the call to the call handling system 120 while a voice channel of the call is routed directly between the caller telephone 105 and the destination telephone 110.

When the call is forwarded to the call handling system 120, the telephone network 115 is configured to send call-related information to the call handling system 120 over a signaling channel. The call-related information includes call origin and call destination information. The call origin information may include the direct number of the caller telephone 105 and the time and date when the call was initiated, and the call destination information may include the direct number of the destination telephone 110. The call origin information may be delivered, for example, through a service known as Automatic Number Identification (ANI), and the call destination information may be delivered, for example, by extracting called number information from the integrated services digital network (ISDN) call setup or, alternatively, through a service known as Dialed Number Identification Service (DNIS).

The telephone network 115 also is configured to receive call handling instructions from the call handling system 120. The call handling instructions are instructions that tell the telephone network 115 how to process a call. The call handling instructions may include, for example, instructions to accept a call, block a call, or forward a call to another telephone number (e.g., to a telephone number corresponding to a voicemail system or to a different telephone).

The telephone network 115 may include a circuit-switched voice network, a packet-switched data network, or any other network able to carry voice data. For example, circuit-switched voice networks may include a Public Switched Telephone Network (PSTN), and packet-switched data networks may include networks based on the Internet protocol (IP) or asynchronous transfer mode (ATM), and may support voice using, for example, Voice-over-IP, Voice-over-ATM, or other comparable protocols used for voice data communications.

The call handling system 120 is a computer system configured to receive a call from the caller telephone 105 that has been forwarded to the call handling system 120 by the telephone network 115. The call handling system 120 applies special handling to the call when the call is from a call source included in the call source list 125. Call sources are added to the call source list 125 after receipt of a particular number of indications that calls from the call source should be handled specially.

The indications may be received from the identity to whom the call is placed or from other identities associated with the identity to whom the call is placed. For example, an indication that calls from the call source should be handled specially may be received from other identities included in one or more contact lists associated with the identities to whom the call is placed. Therefore, calls from a call source may be specially handled for a user that did not actively indicate that calls from the call source should be specially handled.

More particularly, the call source list 125 may include categories that apply to individual users, to users corresponding to particular accounts, to other groups of users, or to all users. The users corresponding to a category are not required to actively indicate that calls from the call sources in the categories should be handled specially. The call source list 125 may be organized or sorted to facilitate determinations of presence of call sources in the call source list 125. A call source whose calls should be specially handled may be identified in the call source list 125 by a phone number of the call source, a name of the call source, an address of the call source, a location of the call source, or another identifier of the call source.

The call handling system 120 receives the call destination direct number from the telephone network 115, identifies one or more identities associated with the call destination direct number, and handles the call for the identified identities in accordance the call source list 125. The identities associated with the call destination direct number may be identified, for example, by accessing an account record indexed by the call destination direct number and stored in a configuration data store. Alternatively, the account record may be indexed by a name or another identifier of a user of the destination telephone 110 or the call destination computer system 135.

The special handling applied to the call may include blocking the call. The special handling also may include ignoring the call such that the call is not answered and is allowed to continuously ring. Alternatively, a message, such as an audio message, may be sent to the telephone network 115 or the caller telephone 105 to instruct the user of the caller telephone 105 not to call the destination telephone 110 again. An electronic message that inspires an audio message indicating the unavailability of the destination telephone 110 to the caller telephone 105 also may be sent to the telephone network 115.

If the call source is not included in the call source list 125, the call may be handled regularly. For example, the call may be forwarded to the destination telephone 110 or to another number, such as a specified cell phone number or a voicemail number. Notifications of the call may be sent to the identified identities, based on preferences associated with the identified identities in general or individually.

The call handling system 120 processes the call by identifying which identities may receive a call notification message based on the account-level and identity-level call handling preferences. The call handling system 120 requests the online status of the identified identities from the online service provider system 140 and generates call notification messages for each identified identity that is online in accordance with the identity-level preferences. The call handling system 120 sends the call notification messages to the online service provider system 140, which sends the call notification messages, along with format data that indicates how the notification messages are to be displayed, over the network 130 to one or more call destination computer systems 135 for presentation to users. Each user of a call destination computer system 135 selects an option presented in the call notification message, and the selected option is sent to the online service provider system 140 over the network 130. The online service provider system 140 relays the selected option to the call handling system 120, which processes the selected option accordingly.

The call handling system 120 processes a selected option by sending a call handling instruction to the telephone network 115 and/or sending an audio message to the caller telephone 105 over the telephone network 115. The call handling system 120 is configured to record, store, access, and play or redirect audio messages. The audio messages may be personalized by subscribers to the call handling services and may be stored in a data store and indexed, for example, by the number of the destination phone of the subscriber.

The network 130 is configured to enable direct or indirect communications between the call handling system 120, the online service provider system 140, and one or more call destination computer systems 135. Examples of the network 130 include the Internet, Wide Area Networks (WANs), Local Area Networks (LANs), analog or digital wired and wireless telephone networks (e.g., Public Switched Telephone Network (PSTN), Integrated Services Digital Network (ISDN), and Digital Subscriber Line (xDSL)), cable, satellite, and/or any other delivery or tunneling mechanism for carrying data.

In some implementations, the network 130 and the telephone network 115 are implemented by a single or otherwise integrated communications network configured to enable voice communications between the caller telephone 105, the destination telephone 110, and the call handling system 120, and to enable communications between the call handling system 120, the online service provider system 140, and the one or more call destination computer systems 135.

The online service provider system 140 is a computer system configured to provide online data communications services to users, detect online presence of users of call destination computer systems 135, receive call notification messages from the call handling system 120, generate format data and send the format data along with the call notification messages to call destination computer systems 135, and send selected options from the call destination computer systems 135 to the call handling system 120. The online data communications services may include, for example, e-mail services, instant messaging services, Internet access, and/or access to online content.

The online service provider system 140 may detect online presence of users of call destination computer systems 135 in, for example, a manner similar to that used to detect presence in an instant messaging system and/or in a manner similar to that disclosed in application Ser. No. 10/414,167, which is hereby incorporated by reference in its entirety, and which describes the use of client-side communication device monitors. The online service provider system 140 also is configured to receive call notification messages from the call handling system 120, generate format data that is used to format the call notification message for presentation on the call destination computer systems 135, and send the call notification messages to the call destination computer systems 135 in real time.

The format data may vary based on device type. For example, for a device with limited display capabilities, such as a PDA, the format data may enable the device to limit the call notification message to a visual indication of the incoming call (e.g., illumination of a light and a graphical display of a call icon and the caller phone direct number or identity proxy thereof), and may further limit the call handling options that are presented to the user to a subset of the full suite of options (e.g., the option to forward the call to one other phone number). In contrast, the format data sent to a home computer may enable the home computer to provide, for example, an audio and visual indication of the call and to display full caller identity information including address, return phone number, and other information about the caller accessible based on the caller phone number. The format data sent to the home computer also may enable the home computer to present to the user a significantly larger number of call handling options (e.g., the option to play various audio messages, take a message, and forward the call to a phone number selected by the user from a large number of possible phone numbers).

Since the caller is waiting on the caller telephone 105 during the generation and transmission of call notification messages, the online service provider system 140 is configured to send information to and receive information from the call destination computer systems 135 in real time. For example, the online service provider system 140 also is configured to transmit in real time the selected options from the call destination computer systems 135 to the call handling system 120. Accordingly, the online service provider system 140 may be configured to avoid queuing call notification messages or selected options or to avoid further processing the call notification messages or selected options in any way that increases transmission delay. The online service provider system 140 may be configured to provide this functionality in a manner similar to that used by instant messaging systems, or even to leverage instant messaging systems to enable transmission and receipt of call handling and notification messages as instant messages in real time.

The call destination computer system 135 is configured to receive call notification messages and format data from the online service provider system 140, to process the call notification messages in accordance with the format data to enable a user to perceive the call notification, to accept user selection of one of the options offered by the call notification message, and to send the selected option to the online service provider system 140. The call destination computer system 135 may be a general purpose computer, such as a workstation or a personal computer, a PDA, a special purpose computer, an intelligent mobile phone, a pager, or a set top box. The call destination computer system 135 may include one or more software or hardware applications that command and direct communications between the call destination computer system 135 and the online service provider system 140. The applications may enable digital communications to be received from the online service provider system 140. For example, the applications may include a modified instant messaging application configured to receive notification messages and to send selected options in a manner similar to that used to receive and send instant messages.

In some implementations, the call handling system 120 may be integrated into the call destination computer system 135. In such implementations, the call destination computer system 135 may be connected to the telephone line used by the destination telephone 110, as well as to the network 130. For example, a dongle or some other piece of hardware may be used to connect the call destination computer system 135 to the telephone line in parallel with the destination telephone 110. As another example, the destination telephone 110 may be connected to the telephone line thorough the call destination computer system 135. As a result, calls to the destination telephone 110 also may be received by the call destination computer system 135 and by the call handling system 120 that is integrated into the call destination computer system 135 without the calls being forwarded. The call handling system 120 determines if the call is from an undesirable source, and if so, applies special handling to the call, as is done when the call handling system 120 is a standalone system.

In implementations where the call handling system 120 is integrated into the call destination computer system 135, a local copy of the call source list 125 may be maintained at the call destination computer system 135. A central copy of the call source list 125 may be maintained by the online service provider system 140, and additional undesirable call sources may be added to the central copy of the call source list 125. The call source list 125 may be centrally maintained for distribution to other call destinations for use in blocking calls from undesirable sources identified in the call source list 125. The call source list 125 also may be centrally maintained such that the call source list 125 is not lost if the call destination computer system 125 fails. The call destination system 135 may periodically request an updated copy of the call source list 125 from the online service provider system 140, or the online service provider 140 may periodically provide the call destination system with an updated copy of the call source list 125. The call handling system 120 uses the local copy of the call source list 125 when determining if calls to the destination telephone are from undesirable sources.

Referring to FIG. 2, a call notification interface 200 may be presented to a user associated with a telephone number to which a call announced by the call notification interface 200 was placed. The call notification interface 200 includes caller identification information 205, a block telemarketer option 210, an answer option 215, a send message option 220, a take message option 225, and an ignore option 230.

The call notification interface 200 may be displayed on a computer system used by the user to access the Internet. The call notification interface 200 may be presented to the user while a destination telephone used by the user is occupied. For example, the user may be using the destination telephone and an associated phone line to connect to the Internet. Alternatively or additionally, the call notification interface 200 may be presented to the user when the call is received, regardless of whether the destination telephone is occupied. In such a case, all calls to the destination telephone are routed both to the computer system and to the destination telephone.

The caller identification information 205 includes information identifying a caller telephone from which the call was placed and a user of the caller telephone. The caller identification information may include a name of the user, a phone number corresponding to the caller telephone or to the user, and a location of the caller telephone or of the user. The location may be a street address or a city and a state that is derived from the phone number included in the caller identification information 205. For example, the phone number, and more particularly the area code of the phone number, may be used to identify the corresponding location.

The block telemarketer option 210 is used to indicate that the user desires to block future calls from the caller telephone and the user of the caller telephone. Selecting the block telemarketer option 210 generates an indication of such a desire that is sent to a call handling system, such as the call handling system 120 of FIG. 1, that maintains a list 125 of sources of calls that are to be blocked. If a particular number of such indications are received, then calls from the caller telephone and the caller may be blocked for other users associated with the user. The block telemarketer option 210 may be selected when the user determines that the caller telephone and the caller represent a telemarketer or another undesirable call source.

In addition to generating the indication when selected, the block telemarketer option 210 may cause a message indicating that the block telemarketer option 210 has been selected to be sent to the caller. The message may be an audio message that may be played for the caller over the caller telephone. Alternatively or additionally, an electronic message, such as an instant message or an e-mail message, may be sent to the caller if addressing information for the electronic message is available. The message also may be included in an interface or a notification presented to the caller on a computer system used by the caller.

The answer option 215 enables the user to indicate that the call is to be received. The user may participate in the call using a microphone and speakers associated with the computer system on which the call notification interface 200 is displayed. Alternatively, the user may use the destination telephone to participate in the call.

Selecting the send message option 220 causes a message to be sent to the caller. The message may indicate that the user is busy, otherwise unavailable to receive the call, or does not desire to receive the call, for example, because the caller is a telemarketer. Like the message sent when the block telemarketer option 210 is selected, the message may be an audio message or an electronic message, or may be included in an interface or a notification that is presented to the caller.

Selecting the take message option 225 causes the call to be forwarded to a voicemail service that then may take a message. The user does not actively participate in the call or in taking the message after selecting the take message option 225.

The ignore option 230 may be selected by the user when the user does not wish to receive the call, for example, because the user does not wish to receive or otherwise handle a call from the caller identified in the caller identification information 205. Selection of the ignore option 230 may cause the call to ring continuously for the caller without providing an indication to the caller that the call is being ignored by the user.

Referring to FIG. 3, a message notification interface 300 may be presented to a user for which the call notification interface 200 of FIG. 2 was displayed. More particularly, the message notification interface 300 may be displayed for the user after the user selects the block telemarketer option 210 of the call notification interface 200. In some implementations, the message notification interface 300 may be displayed only after the send message option 220 has been selected. The message notification interface 300 includes a message 305, an accept button 310, a reject button 315, an option 320, and a link 325.

The message 305 informs the user that a message indicating that the call was not received because the caller is believed to be a telemarketer has been played for the caller. The message 305 may provide the user with the option of blocking future calls from the caller. In other words, the user is provided with the option of generating an indication of a desire to block future calls from the caller. Selecting the accept button 310 generates such an indication, while selecting the reject button 315 causes the message notification interface 300 to be dismissed without generating such an indication. When the accept button 310 is selected, the generated indication is sent to a call handling system, such as the call handling system 120 of FIG. 1.

When selected the option 320 prevents the message notification interface 300 from being presented to the user in the future. Therefore, selecting the option 320 prevents the user from having the option to indicate the desire to block future calls from the caller when selected. When the accept button 310 is selected after the option 320 is selected, an indication of the desire to block future calls from the caller may be generated automatically without presenting the message notification interface 300.

The link 325 provides the user with access to the National Do Not Call Registry. More particularly, a web site of the National Do Not Call Registry may be displayed for the user in a web browser when the link 325 is selected. The user may view the web site to gather information about the National Do Not Call Registry and to determine whether to register with the National Do Not Call Registry. The web site also may include an indication of whether the caller is a telemarketer and whether other users have indicated the desire to block calls from the caller.

Figure 4:
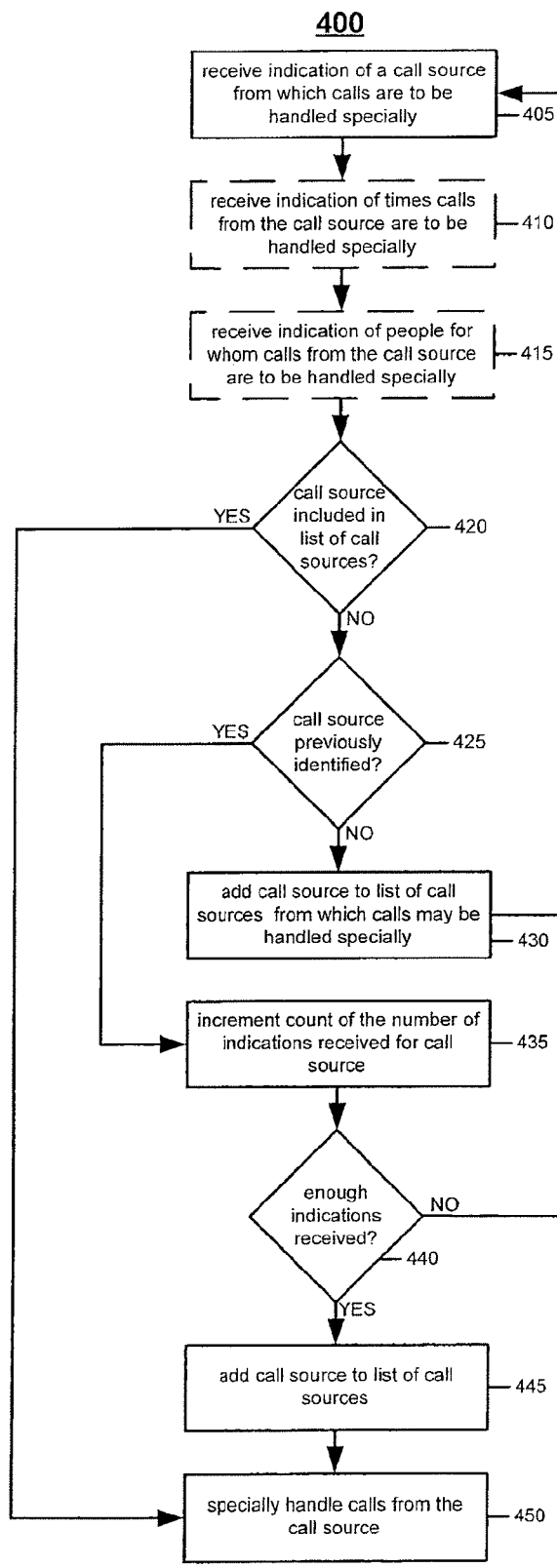
FIG. 4 is a flow chart of a process for specifying a list of call sources whose calls are specially handled for a group of users.

Referring to FIG. 4, a process 400 is used to specify a list of call sources such that special handling may be applied to future calls from the call sources. The list of call sources may be applied to calls to a single user or to a group of associated users. The process 400 is executed by a call handling system, such as the call handling system 120 of FIG. 1, in response to indications of a desire to block future calls from a call source that are received from a destination telephone, such as the destination telephone 110 of FIG. 1, or a computer system at the destination telephone, such as the call destination computer system 135 of FIG. 1.

The process 400 begins when an indication of a call source from which calls are to be handled specially is received (405). The indication may be generated by and received from an interface, such as a log of calls or the notification interfaces 200 and 300 of FIGS. 2 and 3. The interface is displayed on the call destination computer system in response to a call from the call source. Alternatively, the indication may be generated by and received from the destination telephone, for example, after a user of the destination telephone enters a code into a keypad of the destination telephone that causes the indication to be generated.

An indication of times at which calls from the call source are to be handled specially also may be received (410). The indication may be received from an interface presented on the call destination computer system. For example, the indication of the times may specify that calls from the call source are blocked every day from 6:00 P.M. to 8:00 P.M, all day Saturday, and all day Sunday. As another example, the indication may specify that the calls are to be handled specially when a destination phone line for the calls is occupied. In other words, the indications of the times may include actual times for which the calls are to be handled specially or situations or events during which the calls are to be handled specially.

In addition, an indication of people for whom calls from the call source are to be handled specially may be received (415). For example, the calls from the call source may be handled specially for a single user from which the indication of the call source is received, or for multiple users associated with the single user. More particularly, calls may be handled specially for people known to the user, such as people included in a contact list of the single user or people included in a group of the contact list. The indication may specify the people individually by name or another identifier, or by a name of the contact list or the group within the contact list.

A determination of whether the indicated call source is included in the list of call sources that is maintained by the call handling system is made (420). If not, then a determination is made as to whether at least one other indication of the desire to block future calls from the indicated call source has been received (425). In other words, a determination is made as to whether calls from the indicated call source have been identified previously as candidates for special handling. If no previous indications of the call source were received, then the call source is added to a set of call sources whose calls may be handled specially (430). For each call source in the set, a count of the number of indications reflecting the desire to specially handle future calls from the call source is maintained. After the call source is added to the set, processing of the received indication of the call source is complete, and the call handling system waits until another indication of a call source is received.

The call handling system then increments a count of the number of such indications of the call source that have been received (435), and determines whether a number of indications made is sufficient for the call source to be added to the list of call sources (440). For example, a threshold number of indications may be required before the call source is added to the list of call sources. If a sufficient number of indications have not yet been received, processing of the received indication of the call source is complete, and the call handling system waits until another indication of a call source is received.

If enough indications of the call source have been received, then the call source is added to the list of call sources (445). More particularly, an identifier of the call source, such as a phone number of the call source, is added to the list of call sources. In addition, the received indications of times at which special handling is to be applied to the calls from the call source may be associated with the call source in the list. The received indications of people for whom special handling is to be applied to the calls from the call source may be associated with the call source in the list or may be used to identify a category for the call source within the list.

As a result of the call source being added to the list (445) or already being included in the list (420), future calls from the call source are then specially handled. The special handling applied to the future calls from the call source will be described with respect to FIG. 5.

The list of call sources that is maintained with the process 400 may be distributed by the call handling system to other systems that may apply the special handling to the calls from the call sources included in the list. For example, the list may be distributed to destination telephones and call destination computer systems to which the calls are placed. Distributing the list to the destination telephones and the call destination computer systems may make the special handling more reliable because multiple systems are applying the special handling to the calls. More particularly, distributing the list enables the special handling to be applied after failure of the call handling system. Distributing the list also may improve the performance of the call handling system by reducing the responsibilities of the call handling system.

In one implementation, the call handling system maintains three sets of call sources. The first set includes those call sources that have been added to the list of call sources. In other words, the first set is the list of call sources. The second set includes call sources that have not yet been added to the list of call sources and for which at least one indication of a desire to block future calls has been received. The third set includes those calls sources for which no such indications have been received. A call source is initially found in the third set, and may be moved to the second set and then to the first set. The three sets may be color coded. For example, the first set may be given a red color to indicate that calls from the included call sources are blocked. The second set may be given a yellow color to indicate that calls from the included call sources are allowed, but that the calls may not be allowed in the future. The third set may be given a green color to indicate that calls from the included call sources are allowed. Color coding the three sets may be particularly useful when the call sources are presented. For example, a call source may be presented in a color of its corresponding set to indicate whether calls from the call source are or will be blocked or allowed.

Figure 5:
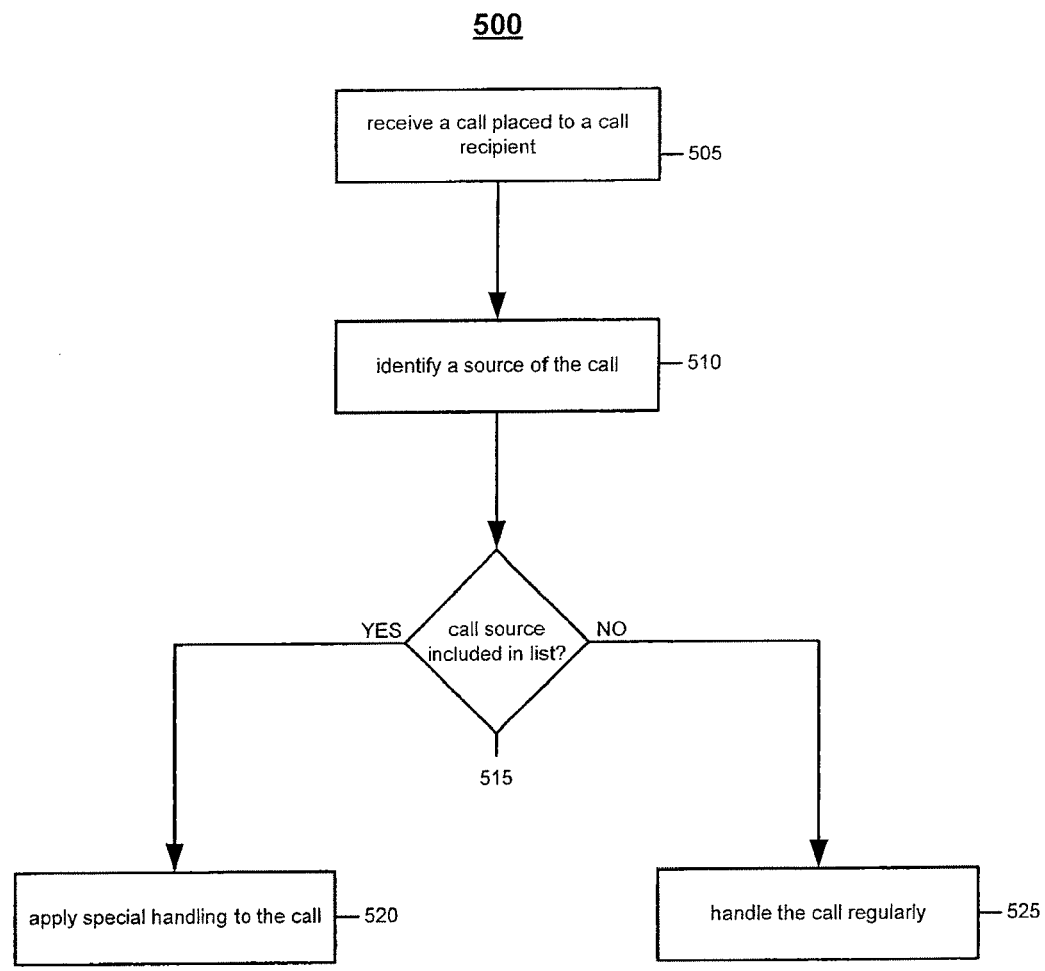
FIG. 5 is a flow chart of a process for handling a telephone call based on whether the call is from a source included in a list of call sources whose calls are handled specially.

Referring to FIG. 5, a process 500 is used to determine whether special handling should be applied to a call placed to a call recipient. The determination is based on whether a call source that placed the call is included in a list of sources of calls to which special handling is to be applied. The process 500 is executed each time a call to the call recipient is placed. The process 500 is executed by a system that maintains the list of call sources. For example, the process 500 may be executed by a call handling system on which the list of call sources was originally specified, such as the call handling system 120 of FIG. 1. Alternatively, the process 500 may be executed by a system used by the call recipient that is capable of applying special handling to the call, such as the destination telephone 110 or the call destination computer system 135, and to which the list of call sources has been provided. Multiple instances of the process 500 may be executed in parallel to apply special handling to calls placed to multiple call recipients.

The process 500 begins when a call to the call recipient is received at the system executing the process 500 (505). For example, all calls to the call recipient may be routed to the system executing the process 500. A source of the call is identified (510). More particularly, an identifier of the call source, such as a phone number of a telephone from which the call was placed, may be identified. The phone number may be identified using the ANI service. The identifier of the call source may be a name of the call source, an address of the call source, or a location of the call source, which may be identified from the phone number of the call source identified using the ANI service.

A determination is made as to whether the call source is included in the list of call sources (515). In one implementation, the list of call sources includes identifiers of the call sources, and determining whether the identified call source is included in the list of call sources may include determining if the identified identifier of the call source is one of the identifiers included in the list of call sources. In implementations where the list of call sources is separated into categories, a category of the list of call sources that includes the identified call source may be identified. Information associated with the call source in the list, such as times at which, and people for whom, special handling is applied to calls from the call source, also may be identified.

If the call source is included in the list of call sources, then special handling may be applied to the call (520). The special handling may result in the call being blocked from the call recipient. Alternatively, the call may be forwarded to the call recipient with additional information identifying the call as originating from a call source included in the list. The additional information may cause the call to ring differently on a telephone used by the call recipient than other calls from call sources that are not included in the list. The additional information also may indicate the number of received indications that reflect a desire of one or more of the multiple call recipients to block future calls from the call source. The additional information may be presented to the call recipient, for example, in a notification that the call originated from a call source included in the list of call sources.

An audio message indicating that the special handling is being applied to the call may be played for the call source. The audio message may inform the call source that future calls from the call source will be blocked. A notification that the call originated from a call source included in the list of call sources also may be displayed for the call recipient.

If a category for the call source has been identified, then the special handling may be applied to the call only when the call recipient corresponds to the identified category. For example, if the call source is part of a category that corresponds to a particular group of users, special handling may be applied to the call only when the call recipient is a member of the particular group. In addition, if ranges of times at which special handling is applied to calls from the call source are associated with the call source in the list, special handling may be applied to the call only when the time at which the call was placed or received is in one of the associated ranges of times.

However, if the call source is not included in the list of call sources, then the call may be handled regularly (525). In other words, the call simply may be forwarded to the call recipient without restriction. The call recipient may be notified that the call is being handled regularly. If indications reflecting the desire to specially handle future calls from the call source have been received, but the call source has not yet been added to the list of call sources, the call may be forwarded to the call recipient with additional information indicating that the indications have been received but that the call source has not yet been added to the list. The additional information may indicate the number of indications that have been received. The additional information may be presented to the call recipient in a notification of the call that is presented to the call recipient. Alternatively or additionally, the additional information may cause the call to ring differently than other calls on the call recipient's telephone. The call recipient may be enabled to generate an indication reflecting a desire to add the call source to the list of call sources such that special handling may be applied to future calls from the call source. Such an indication may be generated, for example, through use of the notification interfaces 200 and 300 of FIGS. 2 and 3.

Figure 6B:
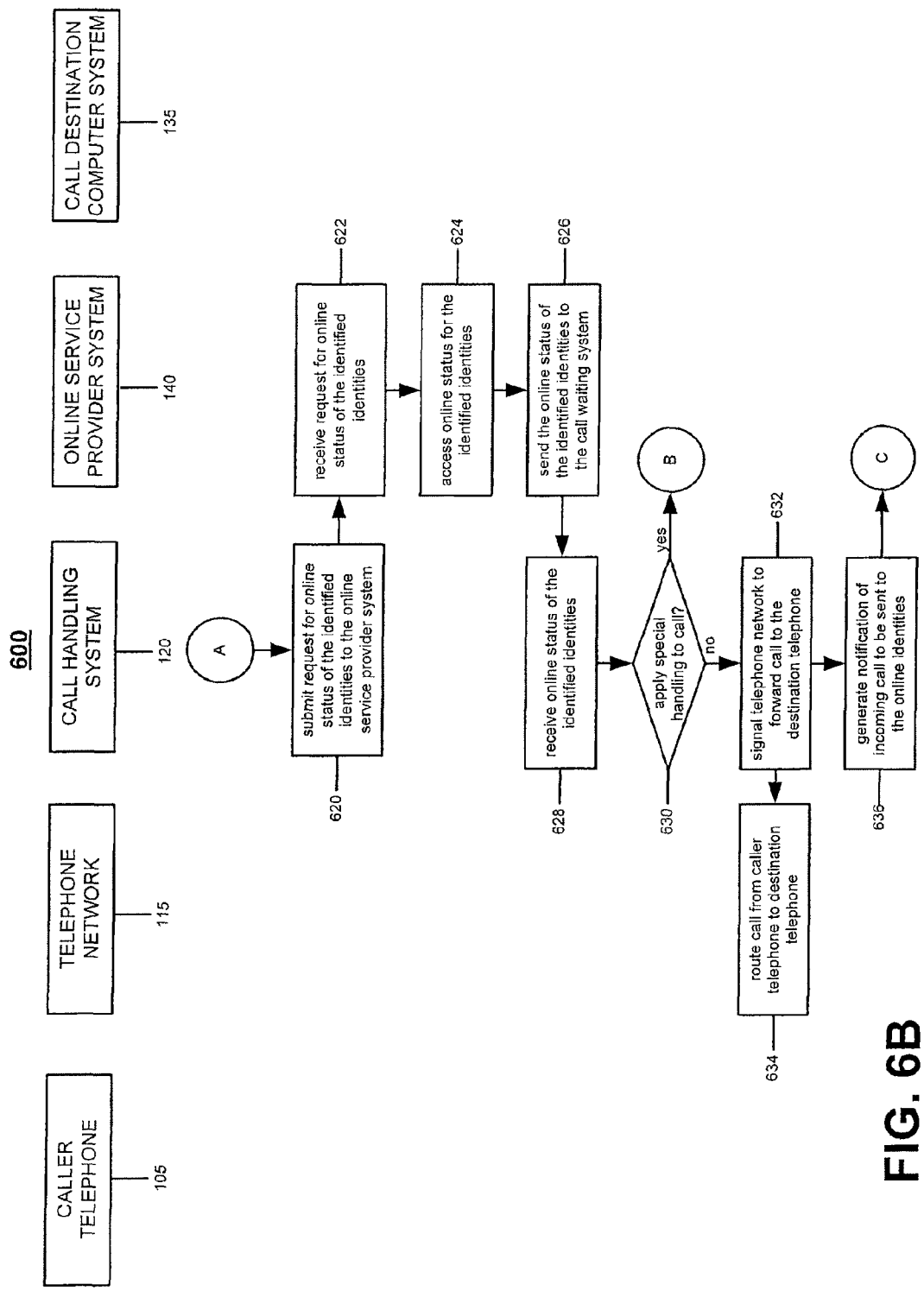
Figure 6C:
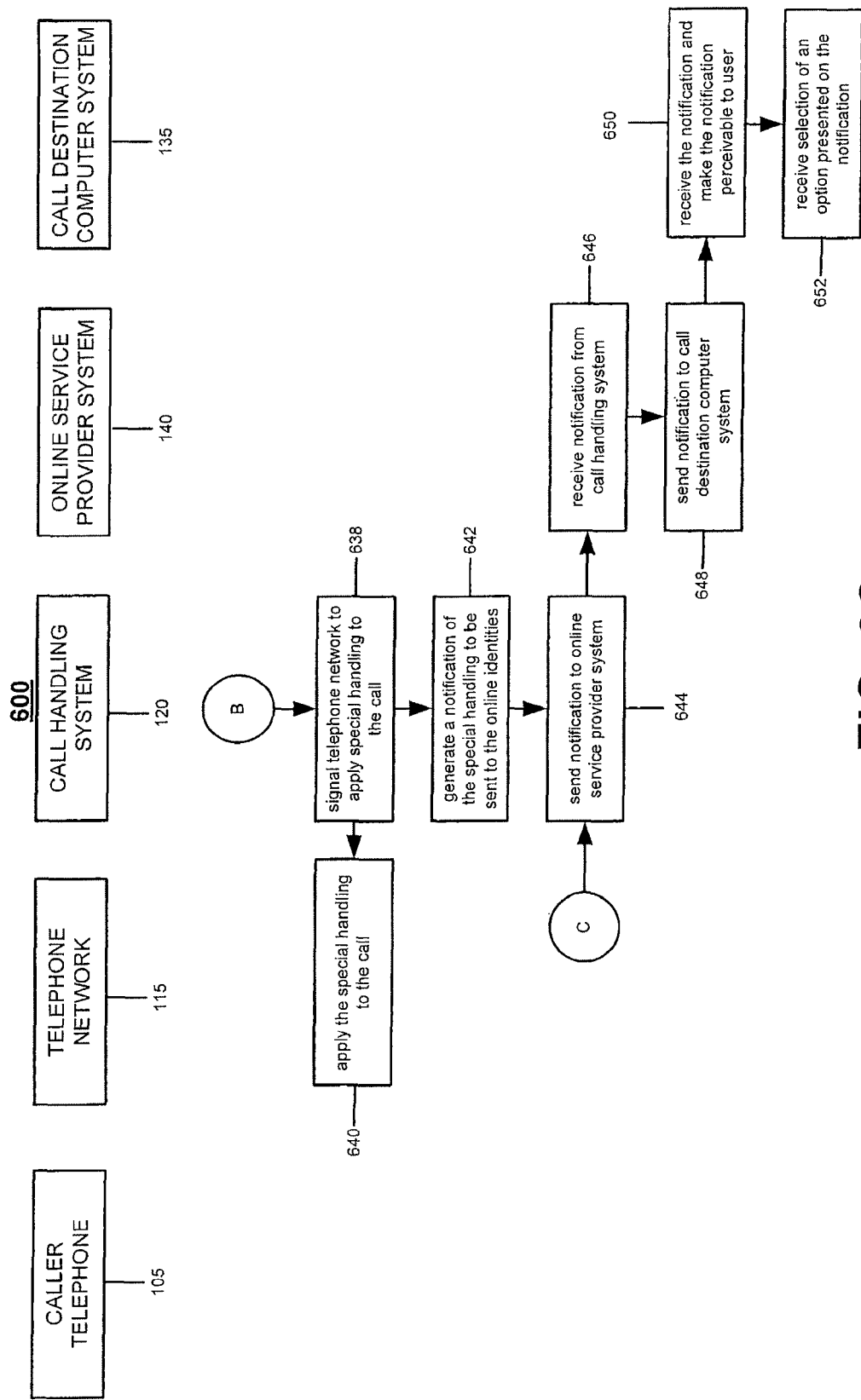

Referring to FIGS. 6A-6C, a process 600 is used for handling a call to a call recipient for which calls from undesirable sources are handled specially. For convenience, particular components described with respect to FIG. 1 are referenced as performing the process 600. More particularly, the process 600 involves a caller telephone 105, a telephone network 115, a call handling system 120, an online service provider system 140, and a call destination computer system 135. However, similar methodologies may be applied in other implementations where different components are used to define the structure of the system, or where the functionality is distributed differently among the components shown by FIG. 1. For example, similar methodologies may be applied in implementations where the call handling system 120 is integrated into the online service provider system 140.

A user of the caller phone 105 places a call to the destination telephone by dialing the number of the destination telephone (602). The telephone network 115 receives the call from the caller telephone 105 (604) and sends information describing the call to the call handling system 120 (606), which receives the call information (608). The call information may be sent to the call handling system 120 over a signaling channel, and may include a phone number of the destination of the call, and a time and date when the call was initiated.

The call handling system 120 identifies and accesses an account based on the number of the destination telephone (610). The account may be identified, for example, by accessing an account record stored in a configuration or registration data store and indexed by telephone number. The call handling system 120 determines whether special handling is to be applied to the call (612). The determination may be based on the accessed account. More particularly, the accessed configuration information may include preferences that indicate whether special handling should be applied to the call. Alternatively or additionally, the accessed registration information may indicate whether the destination telephone has registered for the special call handling.

If special handling is not to be applied to the call, then the call handling system 120 signals the telephone network 115 to forward the call to the destination telephone (614). The call handling system 120 may send the signal over the signaling channel. In response to the signal, the telephone network 115 routes the call from the caller telephone 105 to the destination telephone (616). To do so, the telephone network 115 may construct or redirect a voice path from the caller telephone 105 to the destination telephone.

If special handling is to be applied to the call, then the call handling system 120 identifies identities associated with the accessed account (618). In one implementation, the identities associated with the account are stored in the previously accessed account record. The call handling system 120 sends a request to the online service provider system 140 for the online status of the identified identities (620).

The online service provider system 140 receives the request for the online status of the identified identities (622) and accesses the online status of the available identities (624). The online status of the identities may be stored, for example, in a presence data store that is constantly updated in real-time in a manner similar to that used in instant messaging systems to reflect activity of a user at the call destination computer system 135. The online service provider system 140 sends the online status of the available identities to the call handling system 120 (626), which receives the online status of the identified identities (628).

The call handling system 120 determines whether special handling should be applied to the call (630). More particularly, the call handling system 120 determines whether the caller telephone 105 is included in the list of call sources whose calls are specially handled. In addition, the call handling system 120 may determine whether people and times associated with the call source in the list correspond to the people and times for which the special handling will be applied to the call.

If the call handling system 120 determines that special handling is not to be applied to the call (630), then the call handling system 120 signals the telephone network 115 to forward the call to the destination telephone (632), and the telephone network 115 routes the call from the caller telephone 105 to the destination telephone in the manner discussed above (634). The call handling system 120 may send the signal to the telephone network 115 over the signaling channel. Before signaling the telephone network 115 to forward the call, the call handling system 120 may associate additional information with the call. The call handling system 120 also generates a notification of the incoming call to be sent to the identified identities that are currently online (636). The notification may include the additional information that was associated with the call. If none of the identified identities are online, then no notifications are generated.

If the call handling system 120 determines that special handling is to be applied to the call (630), the call handling system 120 signals the telephone network 115 to apply the special handling to the call (638), and the telephone network 115 applies the special handling (640). The call handling system 120 may specify the special handling by sending call handling instructions over the signaling path to the telephone network 115, and the telephone network 115 may process the call handling instructions to apply the special handling to the call. Applying the special handling may include constructing or redirecting a voice path from the caller telephone 105 to the destination telephone.

Before signaling the telephone network 115 to forward the call, the call handling system 120 again may associate additional information with the call. The call handling system 120 also generates a notification of the incoming call to be sent to the identified identities that are currently online (642). The notification may include the additional information that was associated with the call. If none of the identified identities are online, then no notifications are generated.

The notifications that were generated by the call handling system 120 are sent to the online service provider system 140 (644), and the online service provider system 140 receives the notifications from the call handling system 120 (646). The notifications typically are sent out in parallel by the call handling system 120 to minimize transmission delays and arrival time differences between the notifications. The online service provider system 140 distributes the notifications to the identified identities that were previously determined to be online.

The online service provider system 140 sends the notifications to the call destination computer systems 135 corresponding to the online identities (648). Prior to doing so, the online service provider system 140 may associate format data with the notification that specifies how the notification is displayed on the call destination computer systems 135. The sending and receiving of the notifications and format data occur in real time. The call notification messages typically are sent out in parallel by the online service provider system 140 to minimize transmission delays and arrival time differences between call destination computer systems 135.

The call destination computer system 135 receives a notification and makes the notification perceivable to a user of the call destination computer system (650). In one implementation, the call destination computer system 135 enables the user to perceive the notification as a pop-up window or dialog box that appears on a visual display of the call destination computer system 135. The user may select an option presented on the displayed notification, and the call destination computer system 135 receives the selection of the option from the user (652).

Figure 7A:
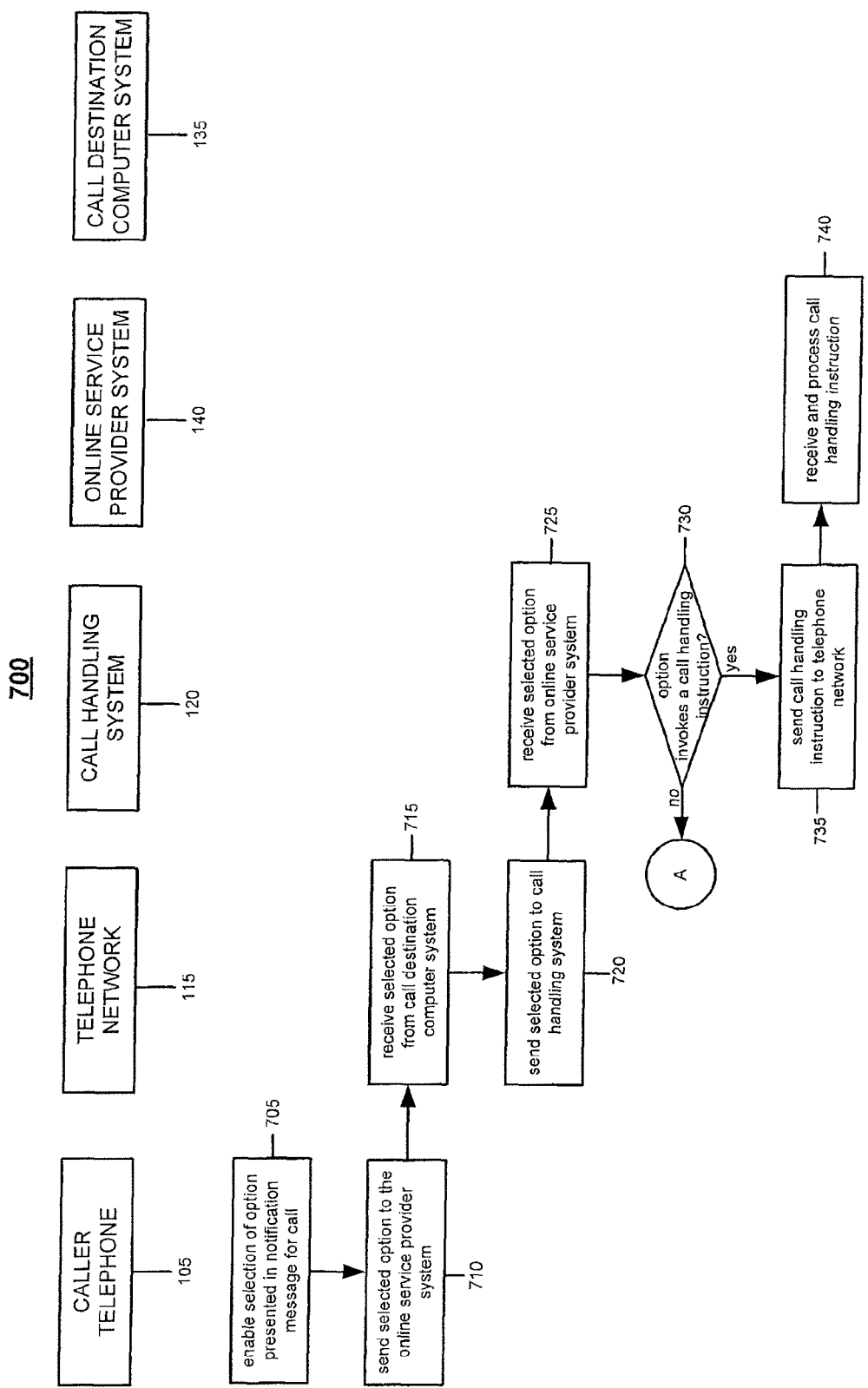
FIGS. 7A and 7B provide a flow chart of a process for handling a call based on the selection of an option from a notification of the call.
Figure 7B:
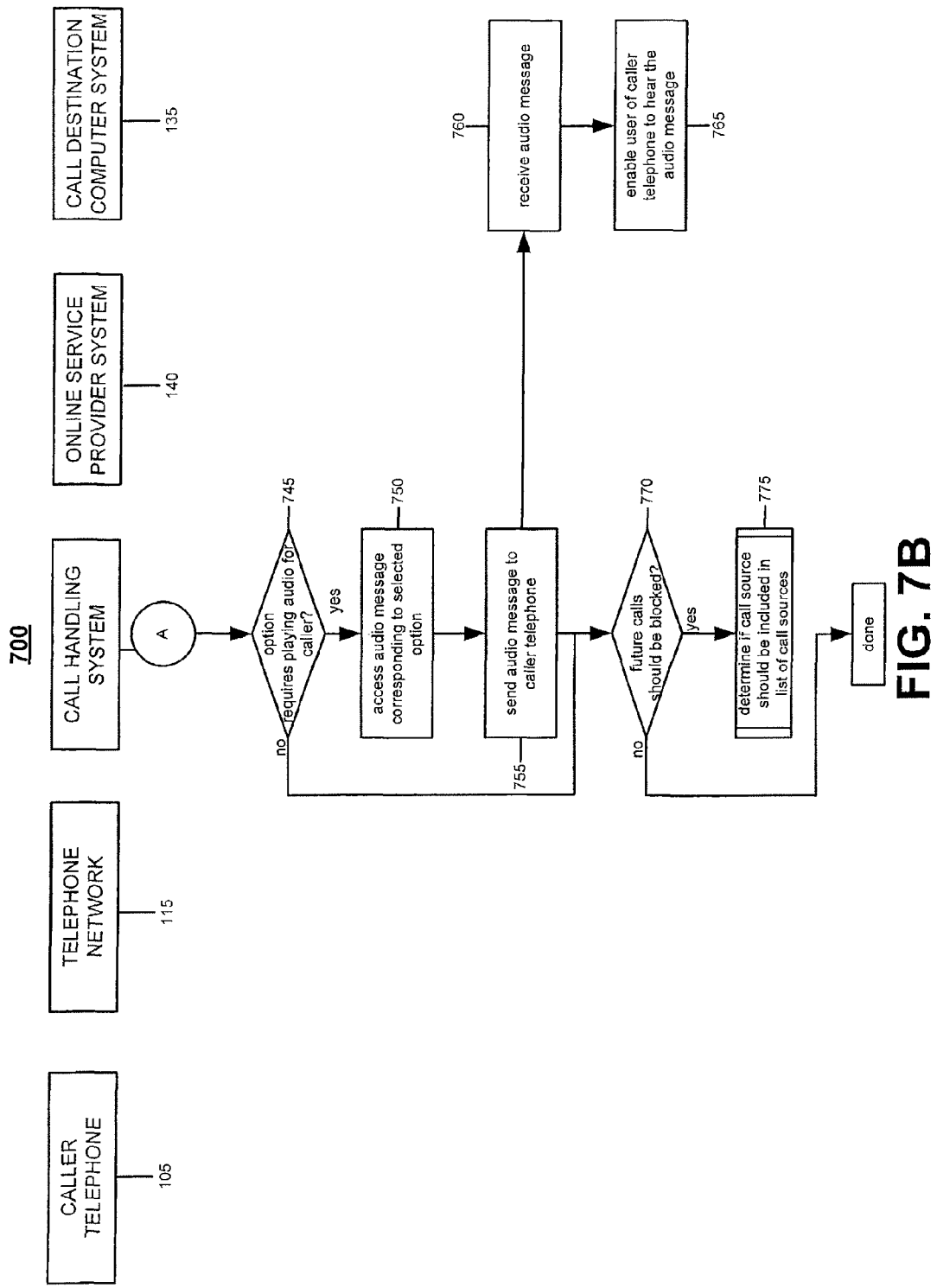

Referring to FIGS. 7A and 7B, a process 700 is used for handling a call based on the selection of an option from a notification of the call, such as the notification interfaces 200 and 300 of FIGS. 2 and 3. For ease of discussion, particular components described with respect to FIG. 1 are referenced as performing the process 700. More particularly, the process 700 includes a call destination computer system 135, an online service provider system 140, a call blocking system 125, a telephone network 115, and a caller telephone 105. However, similar methodologies may be applied in other implementations where different components are used to define the structure of the system, or where the functionality is distributed differently among the components shown by FIG. 1.

The call destination computer system 135 enables a user to select an option offered in the notification (705). In one implementation, the call destination computer system 135 may enable selection of the option prior to expiration of a predetermined time interval (e.g., 15 seconds). The call destination computer system 135 sends the selected option to the online service provider system 140 (710). The online service provider system 140 receives the selected option from the call destination computer system 135 (715), and sends the selected option to the call handling system 120 (720). The online service provider system 140 may do so in real time.

The call handling system 120 receives the selected option (725). The call handling system 120 then determines whether the selected option includes a call handling instruction (i.e., an instruction to forward or ignore the call) (730). If the selected option includes a call handling instruction, the call handling system 120 sends the call handling instruction to the telephone network 115 (735). The call handling instruction may be sent over a signaling channel to the telephone network 115. The telephone network 115 receives and processes the call handling instruction (740). The telephone network 115 may forward or redirect a voice path of the call, if required by the call handling instruction.

The call handling system 120 determines if the selected option requires playing an audio message for a caller that placed the call (745). If the selected option requires an audio message to be played, the call handling system 120 accesses the audio message corresponding to the selected option (750) and sends the accessed audio message to the caller telephone 105 through the telephone network (755). The audio message may be sent to the caller telephone 105 over a voice path through the telephone network 115. The caller telephone 105 receives the audio message (760) and enables a user to hear the audio message (765). In some implementations, the audio message may be identified and sent to the caller telephone 105 before the call handling instruction is identified and processed.

The call handling system 120 determines whether future calls from a source of the call for which the process 700 is executing should be blocked (770). The selected option may indicate that future calls from the call source should be blocked. More particularly, the user of the call destination computer system 135 may select the selected option to reflect a desire to block future calls from the call source. If future calls are to be blocked, then the call handling system 120 determines if the call source should be added to a list of call sources whose calls receive special handling (775). The call handling system 120 may do so through execution of the process 400 of FIG. 4.

Referring to FIG. 8, a call handling interface 800 is used to specify how calls from undesirable call sources are handled. The undesirable call sources are specified in a list of such call sources, such as the call source list 125 of FIG. 1. The call handling interface 800 enables a user to indicate times at which calls from the call sources are handled and people for whom calls from the undesirable call sources are handled. The call handling interface 800 includes call handling options 805-820, a desirable call source list 825, an undesirable call source list 830, call source list controls 835-850, time options 855-880, and people options 885-895.

The call handling options 805-820 enable the selection of a list of undesirable call sources such that special handling may be applied to calls from the undesirable call sources. For example, the option 805 indicates that special handling is not to be applied to any calls because no undesirable call sources exist. The option 810 indicates that the special handling should be applied to all calls from call sources not included in an address book of the user of the call handling interface 800. More particularly, a list of undesirable call sources that includes all call sources not included in the user's address book may be selected with the option 810.

The option 815 indicates that the special handling should be applied to all calls from call sources that are not included in the desirable call source list 825. In other words, a list of undesirable call sources that includes all call sources not included in the desirable call source list 825 may be selected with the option 815. The desirable call source list 825 is a list of call sources whose calls are not to receive the special handling. The desirable call source list 825 may be specified manually by the user of the call handling interface 800. For example, the desirable call source list 825 may be modified with the call source list controls 835 and 840. More particularly, an addition control 835 enables the addition of a desirable call source to the desirable call source list 825, and a removal control 840 removes a selected call source from the desirable call source list 825.

The option 820 indicates that the special handling should be applied to all calls from call sources that are included in the undesirable call source list 830. The undesirable call source list 830 is a list of call sources whose calls are to receive the special handling. The undesirable call source list 830 may be specified manually by the user of the call handling interface 800 or through execution of the process 400 of FIG. 4. For example, the undesirable call source list 830 may be modified with the call source list controls 845 and 850. More particularly, an addition control 845 enables the addition of an undesirable call source to the undesirable call source list 830, and the removal control 850 removes a selected call source from the undesirable call source list 830.

The time options 855-880 enable the specification of a time range during which special call handling is applied to the undesirable call sources identified by the call handling options 805-820. For example, if the options 805-820 indicate that special handling is to be applied to calls from call sources in the undesirable call source list 830, then special handling is applied to calls from call sources in the undesirable call source list 830 during the time range indicated by the time options 855-880. The time options 855-865 enable the specification of a start time of the range, and the time options 870-880 enable the specification of the end time. More particularly, the day of the week of the start time is specified with the option 855, the hour with the option 860, and the minute with the option 865. Similarly, the day of the week of the end time is specified with the option 870, the hour with the option 875, and the minute with the option 880. In some implementations, the time options 855 may be used to specify multiple ranges during which the call handling is applied or withheld, and to apply different ranges to different call sources.

The people options 885-895 enable the specification of people for whom special call handling is applied to calls from the undesirable call sources identified by the call handling options 805-820. More particularly, the option 885 causes the specified call handling to be applied to calls to the user of the call handling interface 800 when selected. The option 890 causes the specified call handling to be applied to calls to members in a contact list maintained by the user, such as a buddy list of an instant messaging system. The option 895 causes the specified call handling to be applied to calls to all possible users. When option 890 or 895 is selected, users on the user's buddy list (when option 890 is selected) or all users (when option 895 is selected) may be given the option to opt in or opt out with respect to having their calls handled based on the user's configuration of the interface 800.

Other people options are possible to enable the specification of other people or groups of people for whom the specified call handling is applied. In one implementation, one of the people options 885-895 must be selected, such that the specified call handling is applied to at least one person.

Figure 9:
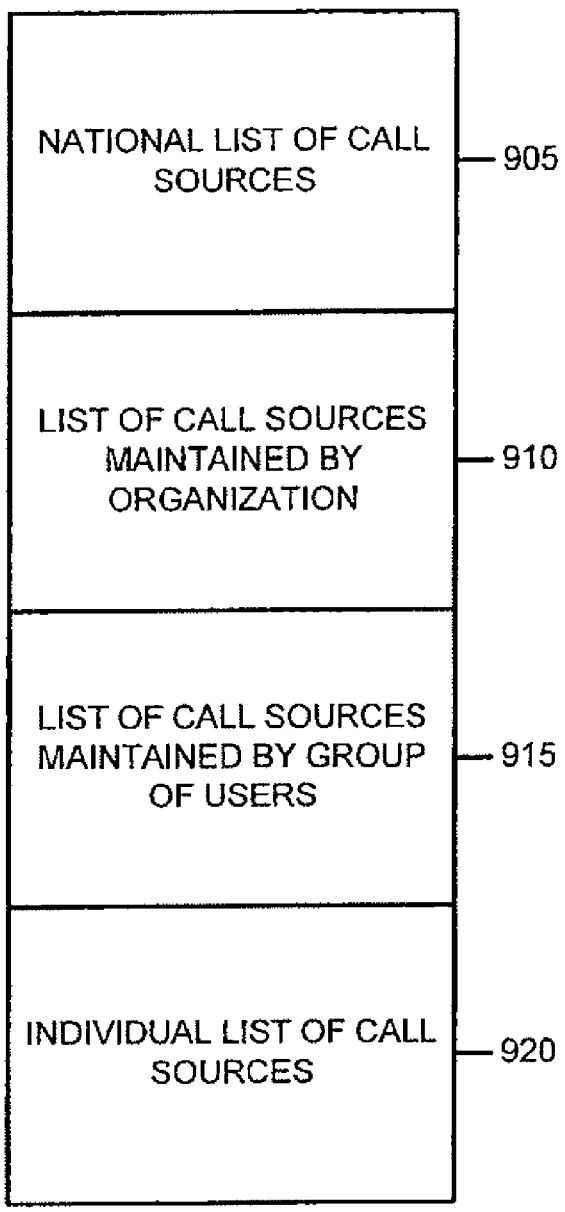
FIG. 9 is a block diagram of a list of call sources whose calls are specially handled.

Referring to FIG. 9, the call source list 125 includes multiple categories 905-920. More particularly, the call source list 125 may include a national category 905, an organization category 910, a group category 915, and an individual user category 920. Each of the categories 905-920 includes one or more identifiers of call sources whose calls are to receive special handling. More particularly, calls from a call source included in a particular category receive special handling only when the calls are placed to users corresponding to the particular category. The call source list 125 may apply to multiple users.

The national category 905 includes sources of calls to which special handling is applied for a global set of users. More particularly, special handling is applied to calls from a call source included in the national category 905 for users corresponding to one or more of the categories 910-920 of the call source list 125. The call sources included in the national category 905 may be suggested for addition by the corresponding users. The national category 905 may correspond to the National Do Not Call Registry or some other similar service that maintains a list of known call sources from which undesirable calls are received or of users that do not desire to receive future calls from the known call sources. Special handling may be applied to calls from a call source included in the national category 905 that are placed to a particular user even though the particular user did not indicate a desire to have special handling applied to calls from the call source.

The organization category 910 includes call sources whose calls are to receive special handling when placed to a member of a particular organization. The particular organization may be a company, a business, or an Internet service provider (ISP). The call sources included in the organization category 910 may be suggested for addition by a member of the organization, such as an employee, a customer, a subscriber, or a user of the organization, using for example, the option 895 of the interface 800. Special handling may be applied to calls from a call source included in the organization category 910 that are placed to a particular member of the organization even though the particular member did not indicate a desire to have special handling applied to calls from the call source. An entry may be placed in the organization category 910 (or the group category 915) only after a threshold number of users in the organization or group has indicated a desire for the call source corresponding to the entry to be placed on the list.

The group category 915 includes call sources whose calls are to receive special handling when placed to a member of a particular group. The group may be a group of people from the organization corresponding to the organization category 915. For example, the group may be a group of employees, customers, subscribers, or users of the organization. Alternatively or additionally, the group may be a group that is not related to the organization, such as a family, a group of friends, or a group of people included in a contact list. The call sources included in the group category 915 may be suggested for addition by a member of the group using, for example, the option 890 of the interface 800. Special handling may be applied to calls from a call source included in the group category 915 that are placed to a particular member of the group even though the particular member did not indicate a desire to have special handling applied to calls from the call source.

The individual user category 920 includes call sources whose calls are to receive special handling when placed to a particular individual. The individual may be a member of the organization corresponding to the organization category 910 or a group corresponding to the group category 915. The call sources included in the individual user category 920 are added to the individual user category 920 by the particular individual using, for example, the option 885 of the interface 800.

In one implementation, the call source list 125 may include multiple individual user categories 920, multiple group categories 915, multiple organization categories 910, and a single national category 905. In such a case, the call source list 125 may apply to all possible users. More particularly, the call source list 125 may include one individual user category 920 for each of the possible users. The call source list 125 also may include a group category 915 for each of the groups to which the possible users belong, and an organization category 910 for each of the organizations to which the possible users belong. Therefore, each of the possible users corresponds to one of the individual user categories 920 and the single national category 905, and may correspond to one or more of the group categories 915 and one or more of the organization categories 910. Special handling may be applied to calls to each of the possible users based on the presence of sources of the calls in categories of the call source list 125 that apply to the user.

In another implementation, the call source list 125 may be constructed for a single user and may include one or more of each of the categories 905-920. More particularly, the call source list 125 may include one individual user category 920 for the single user, a copy of each of the group categories 915 that correspond to groups that include the single user, a copy of each of the organization categories 910 that correspond to organizations that include the single user, and a copy of the national category 905. As a result, maintaining individual call source lists 125 may result in redundant maintenance of instances of the categories 905-920.

Figure 10A:
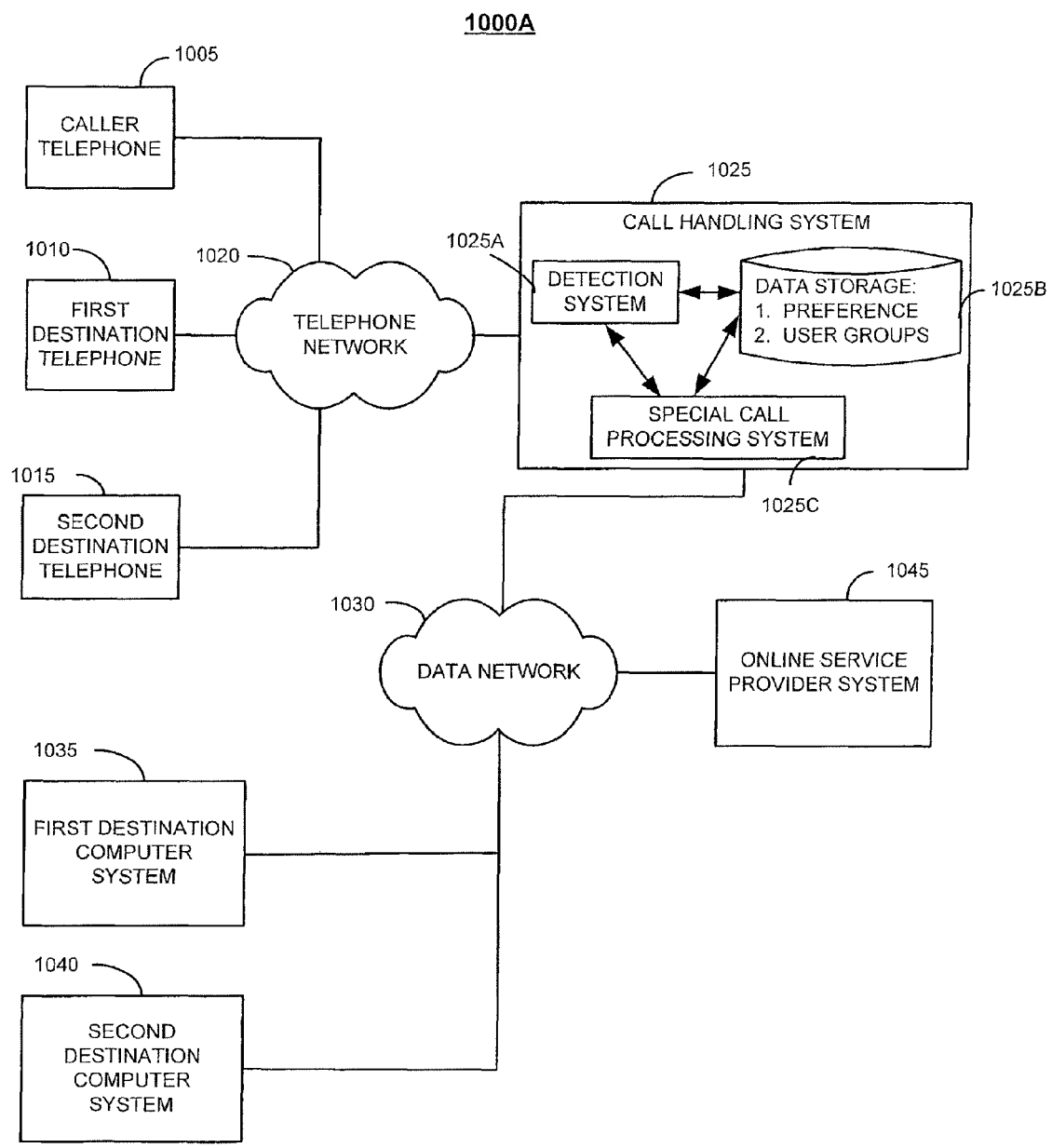
FIG. 10A illustrates a communications system for specially treating calls from call sources.

FIG. 10A illustrates a communications system 1000A for specially treating calls from call sources. The communication system 1000A includes a caller telephone 1005, a first destination telephone 1010, a second destination telephone 1015, a telephone network 1020, a call handling system 1025, a data network 1030, a first destination computer system 1035, a second destination computer system 1040, and an online service provider system 1045. FIG. 10A is described below with a brief reference to other illustrative figures, each of which is later described in more detail.

The caller telephone 1005 is configured to place a call to the first and second destination telephones 1010, 1015. The caller telephone 1005 and the first and second destination telephones 1010, 1015 may be landline phones that allow communication over the telephone network 1020. In another implementation, the caller telephone 1005, the first destination telephone 1010, and/or the second destination telephone 1015 may be a cellular phone or a mobile personal digital assistant (PDA) with embedded cellular phone technology. In yet another implementation, the first destination telephone 1010 may integrate the first destination computer system 1035 and operate as a single computer system. Similarly, the second destination telephone 1040 may integrate the second destination computer system 1040 and operate as a single computer system.

The telephone network 1020 is configured to enable direct or indirect voice communications between the caller telephone 1005, the first and second destination telephones 1010, 1015, and the call handling system 1025. The telephone network 1020 also may be configured to forward calls between the caller telephone 1005 and the first and second destination telephones 1010, 1015 to a voicemail system, another telephone used by a user of the caller telephone 1005, the first and second destination telephones 1010, 1015, or another telephone system that may receive the calls. When a user of the caller telephone 1005 places a call to the first destination telephone 1010 or the second destination telephone 1015, the telephone network 1020 is configured to forward the call to the call handling system 1025. In one implementation, forwarding the call to the call handling system 1025 may include sending information describing the call to the call handling system 1025. More particularly, sending information describing the call may include routing a signaling channel of the call to the call handling system 1025 while a voice channel of the call is routed directly between the caller telephone 1005 and the first destination telephone 1010 or the second destination telephone 1015.

When the call is forwarded to the call handling system 1025, the telephone network 1020 is configured to send call-related information to the call handling system 1025 over a signaling channel. The call-related information includes call origin and call destination information. The call origin information may include the direct number of the caller telephone 1005 and the time and date when the call was initiated, and the call destination information may include the direct number of the destination telephone (e.g., the first destination telephone 1010 or the second destination telephone 1015). The call origin information may be delivered, for example, through a service known as Automatic Number Identification ("ANI"), and the call destination information may be delivered, for example, by extracting called number information from the integrated services digital network ("ISDN") call setup or, alternatively, through a service known as Dialed Number Identification Service ("DNIS").

The telephone network 1020 is also configured to receive call handling instructions from the call handling system 1025. The call handling instructions are instructions that instruct the telephone network 1020 on how to process a call. The call handling instructions may include, for example, instructions to accept a call, block a call and/or forward a call to another telephone number (e.g., to a telephone number corresponding to a voicemail system or to a different telephone).

The telephone network 1020 may include a circuit-switched voice network, a packet-switched data network, or any other network able to carry voice data. For example, circuit-switched voice networks may include a Public Switched Telephone Network (PSTN) and packet-switched data networks may include networks based on the Internet protocol (IP) or asynchronous transfer mode (ATM), and may support voice using, for example, Voice-over-IP, Voice-over-ATM, or other comparable protocols used for voice data communications.

The call handling system 1025 is configured to receive instructions from a first call recipient operating the first destination telephone 1010 on how to treat the incoming phone call from the caller telephone 1005. The call handling system 1025 also is configured to determine how to treat the incoming phone call from the caller telephone 1005 to a second call recipient operating the second destination telephone 1015 based on the number of received indications (e.g., votes) assigned to a selected user group of the second call recipient. The indications may be assigned by the users who are within the selected user group, and the indications may reflect a desire by the users for the special treatment of calls from the call source. In one example, the users include the first call recipient operating the first destination telephone 1010.

Figure 12A:
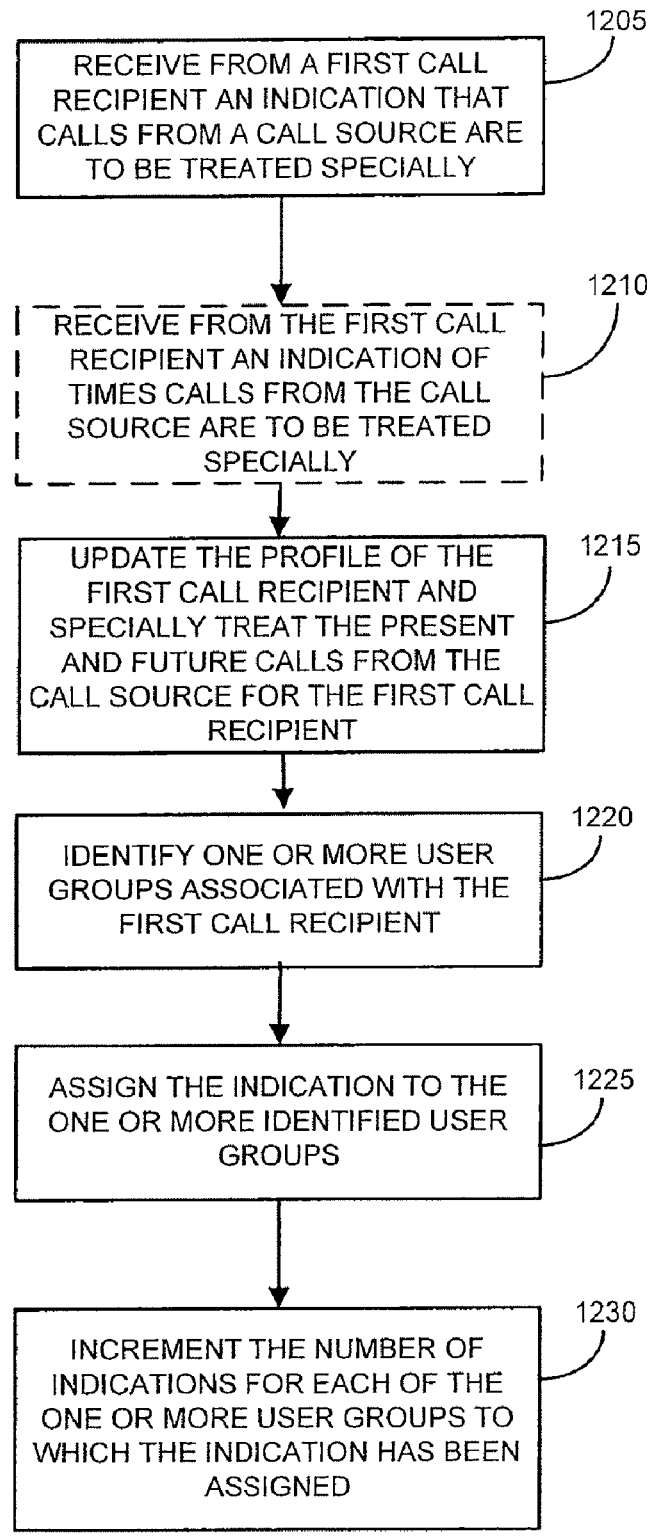
FIG. 12A illustrates an exemplary process that is used to identify a call source to which a special treatment should be applied for at least one user and a desire for similar treatment should be applied for other users associated with the at least one user.
Figure 12B:
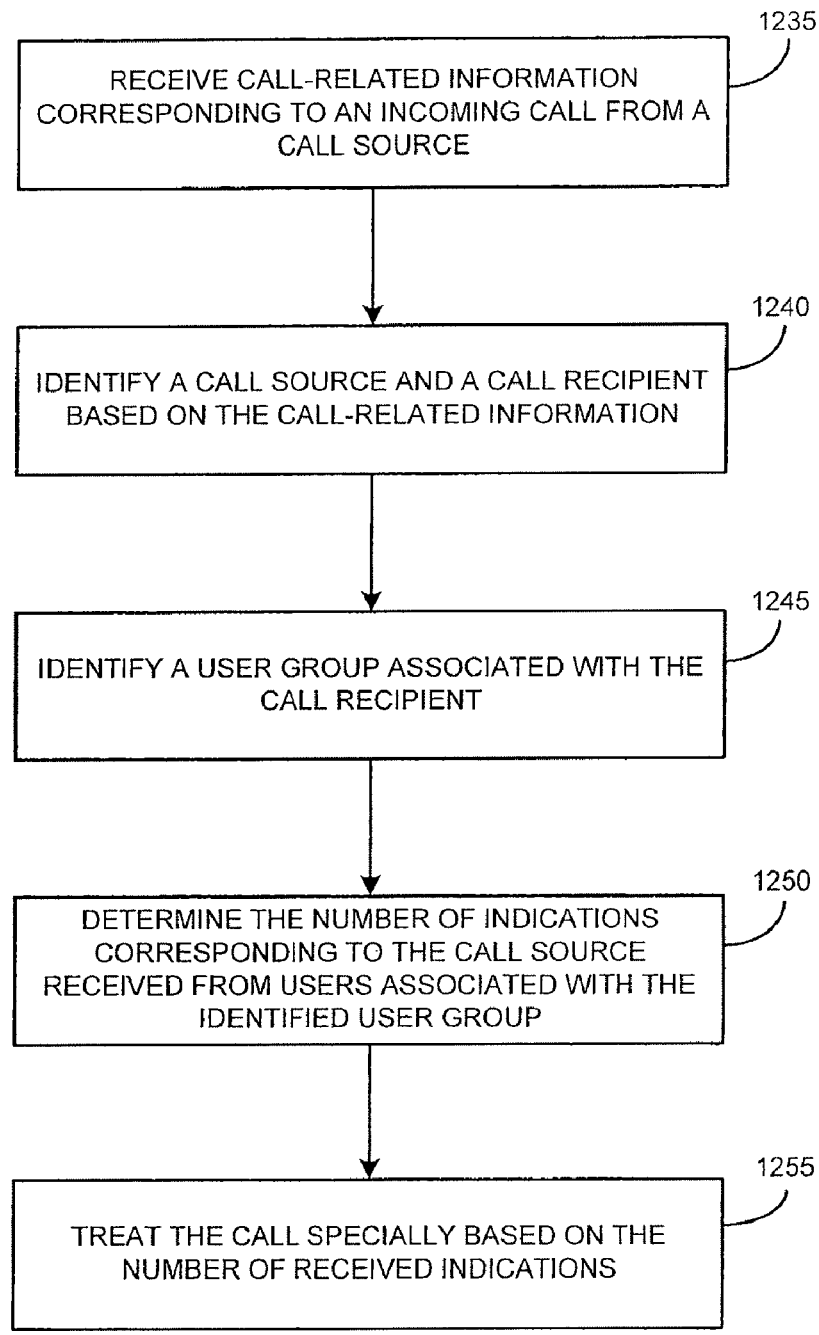
FIG. 12B illustrates an exemplary process used for specially treating calls from a call source to a call recipient based on the number of received indications corresponding to the call source from members of a user group of the call recipient.

Described below first is a process for receiving, at the call handling system 1025 and from the first call recipient, instructions to specially treat the calls from the caller telephone 1005 for the first call recipient and for users (e.g., the second call recipient) included in a user group associated with the first call recipient. FIG. 12A illustrates an example of such a process. Also, described below is a process for specially treating the call from the caller telephone 1005 to the second call recipient based on the number of received indications assigned to a user group that includes the second call recipient by the users (e.g., the first call recipient) within the user group. FIG. 12B illustrates an example of such a process.

First, the first call recipient operating the first destination telephone 1010 receives a call from the caller telephone 1005. The call may be presented to the first call recipient via a UI, such as, for example, the UI 1100A shown in FIG. 11A. The first call recipient may use the UI 1100A to instruct the call handling system 1025 to specially treat the call from the caller telephone 1005. The special treatment may include special presentation and/or handling of calls from the caller telephone 1005. The special presentation may include presenting the calls from the caller telephone 1005 with a particular presentation style. The particular presentation style may include flagging calls from the caller telephone 1005 with a particular color and/or font, and/or causing the calls from the caller telephone 1005 to ring differently. The special treatment also may include specially handling the calls from the caller telephone 1005. The special handling may include blocking calls from the caller telephone 1005 or forwarding calls from the caller telephone 1005 to a particular device (e.g., voice mail device).

Referring also to FIG. 12A, the call handling system 1025 receives, from the first call recipient, the instructions that calls from the caller telephone 1005 are to be treated specially (1205). In response, the call handling system 1025 updates the profile of the first call recipient, and specially treats present and future calls from the caller telephone 1005 to the first destination telephone 1010 according to the received instructions (1215). In one specific example, where the first call recipient requests blocking calls from the caller telephone 1005, the call handling system 1025 blocks calls directed to the first call recipient from the caller telephone 1005, and the call handling system 1025 presents on the first destination computer system 1035 an indication of such action. This informs the first call recipient that caller telephone 1005 called the first call recipient and the call was subsequently blocked.

In addition to using the UI 1100A to instruct the call handling system 1025 to specially treat calls from the caller telephone 1005 to the first destination telephone 1010, the first call recipient also may use the UI 1100A to instruct the call handling system 1025 to specially treat the calls for other users (e.g., the second call recipient). The other users (e.g., the second call recipient) may be associated with the first call recipient by virtue of being within a user group that is associated with or includes the first call recipient. To this end, the first call recipient uses the UI 1100A to selectively assign an indication reflecting a desire for such a treatment to one or more user groups associated with the first call recipient. In response, the call handling system 1025 identifies the one or more user groups associated with the first call recipient (1220) and assigns the indication to the one or more identified users groups (1225).

A user group may be a group of users that share a common interest, trait, or characteristic. User groups include, for example, users in a contact list, a social club (e.g., hunters enthusiast club) and a corporate organization. A user group may be a social group having members that socially interact with each other. A user group also may be a demographic group having users that share, for example, the same age, income, and/or geographic location.

By incrementing the number of indications for each of the one or more user groups to which the indication has been assigned, the call handling system 1025 keeps track of the total number of indications associated with the caller telephone 1005 and received within each of the one or more user groups (1230). If the total number of indications within any of the user groups exceeds a threshold, the call handling system 1025 specially treats calls from the caller telephone 1005 to the users (e.g., the second call recipient) within the user group. Therefore and as more fully described below, calls from a caller telephone 1005 are specially treated for a user (e.g., the second call recipient) who may not have actively indicated that calls from the caller telephone 1005 should be specially treated. As such, the user may take advantage of the experience of other users within the user group of the user who have previously received calls from the caller telephone 1005.

To further illustrate and moving to the second process outlined above, after calling the first call recipient, the caller telephone 1005 may place a call to the second call recipient operating the second destination telephone 1015. In keeping with the above-described example, the first call recipient is assumed to have previously instructed the call handling system 1025 to specially treat the calls for other users (e.g., the second call recipient) associated with the user group of the first call recipient.

Referring also to FIG. 12B, upon placing the call to the second call recipient the call handling system 1025 receives call-related information that identifies the caller telephone 1005 and the second call recipient (1235, 1240). The call handling system 1025 then accesses or otherwise identifies the user group of the second call recipient (1245) and determines the number of indications corresponding to the caller telephone 1005 within the user group (1250). If the number of indications exceeds a threshold, the call handling system 1025 specially treats the calls from the caller telephone 1005 to the second destination telephone 1015 (1255).

To accomplish the above stated objectives, the call handling system 1025 includes a detection system 1025A, a database storage 1025B, and a special call processing system 1025C. The detection system 1025A detects call-related information sent from the telephone network 1020 to the call handling system 1025. As noted above, the call-related information may include call origin (or call source) and call destination information. The call origin information may include the direct number of the caller telephone 1005 and the time and date when the call was initiated, and the call destination information may include the direct number of the destination telephone 1010. The detection system 1025A also detects the first call recipient instructions regarding special treatment of calls from caller telephone 1005 and communicates this information to the data storage 1025B, which stores the instructions in a profile associated with the first call recipient for future reference.

The call handling system 1025 also includes the database storage 1025B which stores personal preferences of the users (e.g., the first and second call recipients). FIG. 10B illustrates an exemplary personal preference table 1000B associated with the first call recipient. The personal preference table may include a list of call sources from which calls should be treated specially. For instance and in keeping with the above-described example, the personal preferences of the first call recipient include a preference to block calls from the caller telephone 1005. The personal preference also may include a preference to apply user groups to filter calls from a call source. For instance, again in keeping with the above-described example, the personal preferences of the second call recipient include a preference to apply user group filtering to calls directed to the second destination telephone 1015. As such, when the caller telephone 1005 calls the second destination telephone 1015, the call handling system 1025 accesses the user group of the second call recipient to determine the number of received indications (if any) relating to the caller telephone 1005 and assigned to the user group. In one specific example and referring to FIG. 10C, the call handling system 1025 accesses a master table, such as, for example, master table 1000C and uses this table to identity the number of indications (if any) related to the caller telephone 1005 and received within the user group of the second call recipient. The master table 1000C identifies one or more user groups and the users associated with each of the one or more user groups. The master table 1000C also shows the preferences associated with each user within the user group.

For example, assuming the caller telephone 1005 is (212) 555-4810, then in the situation illustrated by FIG. 10C, one received indications is associated with the caller telephone 1005 in the first user group to which the second call recipient belongs. In this manner, the call handing system 1025 can easily identify the number of received indications assigned to the caller telephone 1005. And, if the number of received indications exceeds the threshold, the call handling system 1025 specially treats the call for the second call recipient.

The call handling system 1025 also includes the special call processing system 1025C. The special call processing system 1025C carries out the instructions for special treatment. In particular and as described with respect to FIG. 13C, the special call processing 1025C interacts with telephone network 1020 to instruct the telephone network 1020 how to handle the call from the caller telephone 1005. To this end, the special call processing system 1025C may direct the telephone network 1020 to accept the call, block the call, ignore the call, and/or forward the call to another device or another telephone number. In one example, the special call processing system 1025C instructs the telephone network 1020 to ignore the call such that the call is not answered and is allowed to continuously ring. Alternatively, a message, such as an audio message, may be sent to the telephone network 1020 or the caller telephone 1005 to instruct the user of the caller telephone 1005 not to call the destination telephone again. An electronic message that inspires an audio message indicating the unavailability of the destination telephone to the caller telephone 1005 also may be sent to the telephone network 1020.

The special call processing system 1025C also may send notifications of the call to the online identities associated with the destination telephone (e.g., the second destination telephone 1015), based on the preferences of the online identities in general or individually. To this end, the special call processing system 1025C interacts with the data storage 1025B to identify one or more identities associated with the destination telephone (e.g., the second destination telephone) and processes the call by identifying which identities may receive a call notification message based on the account-level and identity-level call handling preferences.

The special call processing system 1025C requests the online status of the identified identities from the online service provider system 1045 and generates call notification messages for each identified identity that is online in accordance with the identity-level preferences. The special call processing system 1025C sends the call notification messages to the online service provider system 1045, which sends the call notification messages, along with format data that indicates how the notification messages are to be displayed, over the network 1030 to one or more call destination computer systems (e.g., the second destination computer system 1040) for presentation to users.

Each user of a computer system selects an option presented in the call notification message, and the selected option is sent to the online service provider system 1045 over the network 1030. The online service provider system 1045 relays the selected option to the special call processing system 1025C, which processes the selected option accordingly.

The special call processing system 1025C processes a selected option by sending a call handling instruction to the telephone network 1020 and/or sending an audio message to the caller telephone 1005 over the telephone network 1020. The special call processing system 1025C is configured to record, store, access, and play or redirect audio messages. The audio messages may be personalized by subscribers to the call handling services and may be stored in a data store and indexed, for example, by the number of the destination phone of the subscriber.

The network 1030 is configured to enable direct or indirect communications between the call handling system 1025, the online service provider system 1045, and one or more computer systems. Examples of the network 1030 include the Internet, Wide Area Networks (WANs), Local Area Networks (LANs), analog or digital wired and wireless telephone networks (e.g., Public Switched Telephone Network (PSTN), Integrated Services Digital Network (ISDN), and Digital Subscriber Line (xDSL)), cable, satellite, and/or any other delivery or tunneling mechanism for carrying data.

In some implementations, the network 1030 and the telephone network 1020 are implemented by a single or otherwise integrated communications network configured to enable voice communications between the caller telephone 1005, the first destination telephone 1010, the second destination telephone 1020, and the call handling system 1025, and also configured to enable communications between the call handling system 1025, the online service provider system 1045, the first destination computer system 1035, and the second destination computer system 1040.

The online service provider system 1045 is a computer system configured to provide online data communications services to users, detect the online presence of users of first and second destination computer systems 1035, 1040, receive call notification messages from the call handling system 1025, generate format data and send the foi mat data along with the call notification messages to first and second destination computer systems 1035, 1040, and send selected options from the first and second destination computer systems 1035, 1040 to the call handling system 1025. The online data communications services include, for example, e-mail services, instant messaging services, Internet access, and/or access to online content.

The online service provider system 1045 detect the online presence of users of first and second destination computer systems 1035, 1040 in, for example, a manner similar to that used to detect the presence of an instant messaging system and/or in a manner similar to that disclosed in U.S. application Ser. No. 10/414,167, which is hereby incorporated by reference in its entirety, and which describes the use of client-side communication device monitors. The online service provider system 1045 also is configured to receive call notification messages from the call handling system 1025, generate format data that is used to format the call notification message for presentation on the first and second destination computer systems 1035, 1040, and send the call notification messages to the first and second destination computer systems 1035, 1040 in real time.

The format data may vary based on a device type representing computer systems 1035, 1040. For example, for a device with limited display capabilities, such as a PDA, the format data allows the device to limit the call notification message to a visual indication of the incoming call (e.g., illumination of a light and a graphical display of a call icon and the caller phone direct number or identity proxy thereof). And, the format data further limits the call handling options that are presented to the user to a subset of the full suite of options (e.g., the option to forward the call to one other phone number). In contrast, the format data sent to a home computer allows the home computer to provide, for example, an audio and visual indication of the call and to display full caller identity information including address, return phone number, and other information about the caller based on the caller phone number. The format data sent to the home computer also may allow the home computer to present to the user a significantly larger number of call handling options (e.g., the option to play various audio messages, take a message, and forward the call to a phone number selected by the user from a large number of possible phone numbers).

Since the caller is waiting on the caller telephone 1005 during the generation and transmission of call notification messages, the online service provider system 1045 is configured to send information to and receive information from the first or second destination computer systems 1035, 1040 in real time. For example, the online service provider system 1040 also is configured to transmit in real time the selected options from the first or second destination computer systems 1035, 1040 to the call handling system 1025. Accordingly, the online service provider system 1045 may be configured to avoid queuing call notification messages or selected options or to avoid further processing of the call notification messages or selected options in any way that increases transmission delay. The online service provider system 1045 may be configured to provide this functionality in a manner similar to that used by instant messaging systems, or even to leverage instant messaging systems to enable transmission and receipt of call handling and notification messages as instant messages in real time.

The first or second destination computer system 1035, 1040 is configured to receive call notification messages and format data from the online service provider system 1045, to process the call notification messages in accordance with the format data to allow a user to receive the call notification, to accept user selection of one of the options offered by the call notification message, and to send the selected option to the online service provider system 1045. The first destination computer system 1035 may be a general purpose computer, such as a workstation or a personal computer, a PDA, a special purpose computer, an intelligent mobile phone, a pager, or a set top box. The first and second destination computer systems 1035, 1040 may include one or more software or hardware applications that command and direct communications between the first and second destination computer systems 1035, 1040 and the online service provider system 1045. The applications may allow digital communications to be received from the online service provider system 1045. For example, the applications include a modified instant messaging application configured to receive notification messages and to send selected options in a manner similar to that used to receive and send instant messages.

In some implementations, the call handling system 1025 is integrated into the first and second destination computer systems 1035, 1040. In such implementations, the first and second destination computer systems 1035, 1040 are connected to the telephone line used by the first and second destination telephones 1010, 1015, respectively, as well as to the network 1020. For example, a dongle or some other piece of hardware is used to connect the first and second destination computer systems 1035, 1040 to the telephone line in parallel with the first and second destination telephones 1010, 1015. As another example, the first and second destination telephones 1010, 1015 are connected to the telephone line through the first and second destination computer systems 1035, 1040, respectively. As a result, calls to the first and second destination telephones 1010, 1015 also are received by the first and second destination computer systems 1035, 1040, respectively, and by the call handling system 1025 that is integrated into the first and second destination computer systems 1035, 1040 without the calls being forwarded. The call handling system 1025 deteiuiines if the call is from an undesirable source, and, if so, applies special handling to the call, as is done when the call handling system 1025 is a standalone system.

FIG. 10B illustrates an exemplary personal preference table 1000B associated with the first call recipient. As noted above, the preference table 1000B includes a list of call sources from which calls should be treated specially. The preference table 1000B includes a call source column 1010B and a treatment preference column 1012B. The call source column 1010B includes the list of call sources and the treatment preference column 1012B includes a treatment that should be applied for each of the call sources. For example, for call source (212) 555-4810, the treatment preference includes blocking the call source. And, for call source (202) 625-6050, the treatment preference includes ignoring the call source. Also the user preference may include a time during which the calls from the call source should be treated specially. For example, as shown in FIG. 10B, the preference may include blocking calls from call source (212) 555-4810 between 8:00 am-5:00 pm.

It should be noted that although the personal preference table 1000B identifies the call source by telephone number, the call source may be identified in other manners. For example, the call source may be identified by the name associated with the telephone number or alternatively by the combination of name and number. Also, it should be noted, that the treatment preferences shown are for illustrative purposes and other preferences, such as, for example, answering, forwarding, and sending a message options may be applied to or associated with the call source.

FIG. 10C illustrates an exemplary master table 1000C associated with a plurality of user groups. As noted above, the master table 1000C is used to identify the number of received indications associated with the call source 1005. The master table 1000C includes a user group column 1005C, a user column 1010C, a treatment preferences column 1012C, and total received indications column 1014C. The user group column 1005C includes the list of user groups (e.g., the first user group and the second user group). The user column 1010C includes the list of users within each of the user groups identified in the user group column 1005C. For example, as shown, the user column 1010C identifies the first and second call recipients within the first user group, and the second and third call recipients within the second user group.

The master table 1000C also includes the treatment preferences column 1012C. The treatment preferences column 1012C includes treatment preferences associated with users within each user group. For example, within the first user group, the treatment preferences associated with the first call recipient includes: (1) a preference to block calls from call source (212) 555-4810; and (2) a preference to ignore calls from (202) 625-6050. For another example, within the first user group, the treatment preference for the second call recipient includes: (1) a preference to block calls from call source (202) 625-6050; and (2) a preference to ignore calls from call source (212) 555-2010. Similarly, the treatment preferences column 1012C includes the preferences associated with the users within the second user group.

The master table 1000C also includes the total received indications column 1014C. The total received indications column 1014C identifies, within each user group, the total number of received indications associated with the call source. For example, within the first user group, the total number of received indications associated with the call source (212) 555-4810 is one, whereas, the total number of received indications associated with the call source (202) 625-6050 is two; and the total number of received indications associated with the call source (212) 555-2010 is one. Additionally or alternatively, the total received indications column 1014C may identify, within all the user groups, the total number of received indications associated with the particular call source. In this manner, the total received indications column 1014C identifies that the total number of received indications associated with, for example, (212) 555-4810 is three.

In either case, when a user (e.g., the second call recipient, keeping with the above-described example) requests to filter calls based on feedback from users within a user group, the call handling system 1025 accesses the master table 1000C to identify the number of received indications associated with the call source (e.g., call source 1005) within the user group. In one implementation, the master table 1000C includes a separate entry, such as, for example, the total received indications column 1014C that tracks the number of received indications associated with each call source within the user group. In another implementation, the call handling system 1025 references the master table 1000C and calculates on the fly the total number of received indications associated with the call source. In either case, if the number of received indications exceeds a threshold, the call handling system 1025 specially treats the call from the call source.

For example, assuming the call source is (212) 555-4810, the call handling system 1025 determines, within the user group of the second call recipient (e.g., the first user group), the total number of received indications associated with the call source is one. The call handling system 1025 then compares this number against a threshold (either set by the system or the user) and if the number exceeds the threshold, the call handling system 1025 specially treats the call from the call source. For instance, if the threshold is zero, then the call handling system 1025 will block the call from the call source and informs the second call recipient that the call from the call source was blocked.

In one implementation, the call handling system 1025 updates the master table 1000C periodically to reflect recent changes among the preferences of the users within the user group. To do so, the call handling system 1025 accesses the personal preference table, such as, for example, table 1000B associated with each user within the user groups, identifies new changes within the personal preferences table, and accordingly updates the master table 1000C. In another implementation, the call handling system 1025 updates the master table 1000C each time a user requests that a particular treatment to be applied to the call source. In response to the request, the call handling system 1025 applies the particular treatment to the call source and updates both the personal preference table and the master table.

Figure 11A:
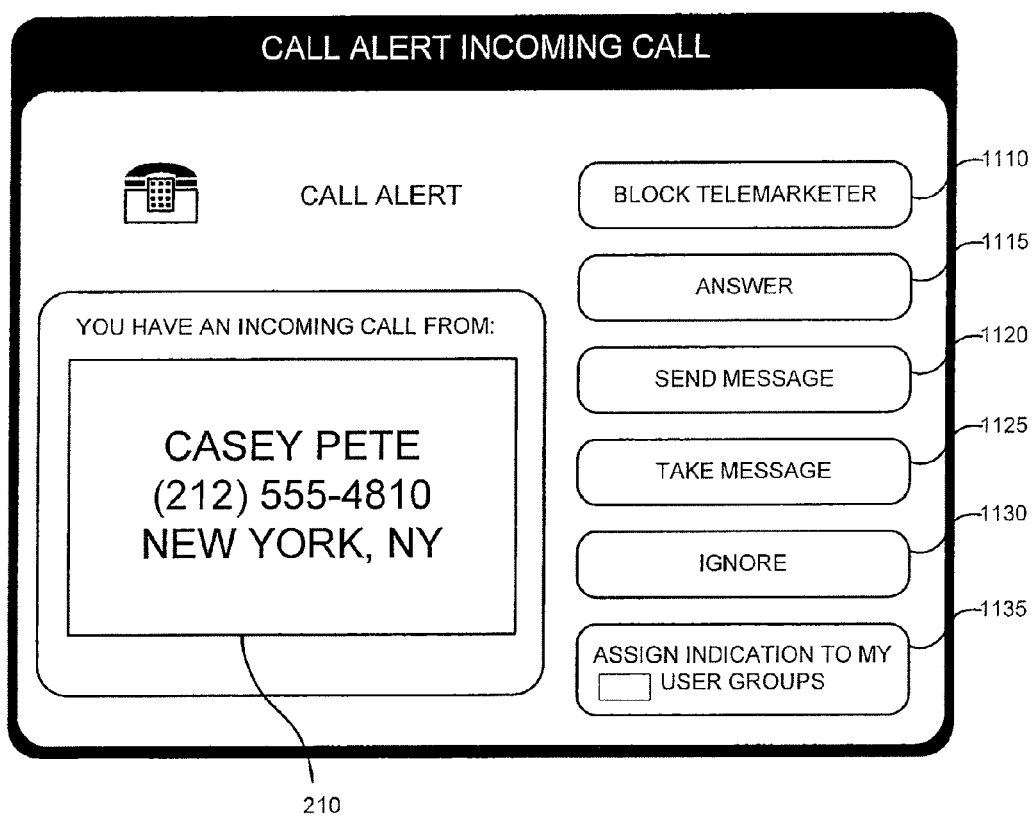
FIG. 11A illustrates a call notification interface that may be presented to a user associated with a telephone number to which a call announced by the call notification interface was placed.

Referring to FIG. 11A, a call notification interface 1100A may be presented to a user associated with a telephone number to which a call announced by the call notification interface 1100A was placed. In keeping with the previous example and for convenience, particular components described with respect to FIG. 10A are referenced in describing the call notification interface 1100A. The call notification interface 1100A includes caller identification information 1105, a block telemarketer option 1110, an answer option 1115, a send message option 1120, a take message option 1125, an ignore option 1130, and an assign an indication to my user groups option 1135. The caller identification information 1105, the block telemarketer option 1110, the answer option 1115, the send message option 1120, the take message option 1125, and the ignore option 1130 are each configured to operate in a similar manner as the caller identification information 205, the block telemarketer option 210, the answer option 215, the send message option 220, the take message option 225, and the ignore option 230, respectively. As such, their operations are not described here in more detail.

The call notification interface 1100A also includes the assign indication to my user groups option 1135. The assign an indication to my user groups option 1135 is used to assign the indication, reflecting the desire of the first call recipient to specially treat calls from the caller telephone 1005, for other users within the first call recipient's one or more user groups. The indication may be a positive, negative, or a neutral one. The positive indication may indicate that the caller is trustworthy, the negative indication may indicate that the caller is untrustworthy, and the neutral indication may indicate lack of any opinion about the caller. In one implementation, the user explicitly selects the indication to be positive, negative, or neutral by, for example, checking an appropriate box in a user interface. For example, selection of each one of the options (1110, 1115, 1120, 1125, and 1130) results in generation of another UI that solicits the user to indicate whether the selection made with respect to the option indicates a positive, negative, or neutral reaction toward the caller.

In another implementation, whether the indication is positive, negative, or neutral is inferred from the selection of one or more options (1110, 1115, 1120, 1125, and 1130) within the UI 1100A, in response to the call from the caller telephone 1005. For example, the indication is deemed to be negative if the first call recipient selects block telemarketer option 1110. Similarly, the indication is deemed to be negative if the first call recipient selects send message option 1120 or the ignore option 1130. The indication may be deemed to be positive, however, if the user selects the answer option 1115. The indication may be deemed to be neutral if the user selects the take message option 1125.

If the first call recipient wishes to assign the indication to the first call recipient's one or more user groups, in one implementation, the first call recipient first selects the box associated with the option 1135, and then selects the indication (e.g., one of the options appearing in the UI 1100A, such as, for example, block telemarketer option 1110). Selection of option 1135 may result in generation of another UI, such as the UI 1100E illustrated by FIG. 11B that is presented to the first call recipient, allowing the first call recipient to identify one or more user groups. For instance, the UI 1100B allows the first call recipient to assign the indication to all or a subset of all user groups of the first call recipient. If the first call recipient selects a subset of all user groups option, another UI is generated that allows the first call recipient to identity the subset. The UI 1100B also includes a default setting option. The default setting option may be associated with the default setting of the first call recipient or the call handling system 1025. In either case, the selection of the default setting option assigns the indication to one or more user groups of the first call recipient based on the default settings. The default settings may be user configurable, and, as such, the first call recipient may be able to change them form time to time.

FIG. 12A illustrates an exemplary process 1200A that is used to identify a call source to which a special treatment should be applied for at least one user (e.g., the first call recipient) and a desire that similar treatment should be applied for other users (e.g., the second call recipient) associated with the at least one user. In keeping with the previous examples and for convenience, particular components described with respect to FIG. 10A are referenced as performing the process 1200A. More particularly, process 1200A is executed by a call handling system 1025 in response to instructions to specially treat the calls from the caller telephone 1005, where the instructions is received from the first call recipient operating the first destination telephone 1010 and/or the first destination computer system 1035.

Process 1200A begins with the call handling system 1025 receiving an indication from the first call recipient that calls from a call source (e.g., the caller telephone 1005) are to be treated specially (e.g., blocked) (1205). The indication may be generated by and received from an interface, such as the UI 1100A. The UI 1100A is displayed on the first destination computer system 1035 in response to a call from the caller telephone 1005. Alternatively, the indication for special treatment may be generated by and received from the first destination telephone 1010, for example, after the first call recipient enters a code into a keypad of the first destination telephone 1010 that causes the indication to be generated.

The call handling system 1025 may optionally receive, from the first call recipient, an indication of times calls from the call source are to be treated specially (1210). The indication of the times specifies, for example, that calls from the caller telephone 1005 should be blocked every day from 6:00 P.M. to 8:00 P.M, all day Saturday, and all day Sunday. As another example, the indication of times specifies that the calls are to be treated specially when the first destination telephone 1010 is occupied. In other words, the indications of the times include actual times for which the calls are to be treated specially or situations or events during which the calls are to be treated specially.

After receiving an indication from the first call recipient, the call handling system 1025 updates the preferences of the first call recipient and specially treats the calls from the call source (1215). The call handling system 1025 updates the preferences of the first call recipient stored in the data storage 1025B for future reference such that all future calls from the call source will be treated specially as indicated by the first call recipient. For instance, the next time the call source (e.g., caller telephone 1005) attempts to call the first call recipient, the call handling system 1025 accesses the preferences of the first call recipient, realizes that the call should be treated specially, and accordingly treats the call.

The special treatment may include special handling of the present and future calls from the caller telephone 1005. As noted above, special handling may include blocking the call. Alternatively, the special handling may include ignoring the call such that the call is not answered and is allowed to continuously ring. In yet another example, special handling includes sending a message, such as an audio message, to the telephone network 1020 or the caller telephone 1005 to instruct the user of the caller telephone 1005 not to call the first destination telephone 1010 again. An electronic message that inspires an audio message indicating the unavailability of the first destination telephone 1010 to the caller telephone 1005 also may be sent to the telephone network 1020. In either case, the call handling system 1025 communicates the special handling instructions to the telephone network 1020 and instructs the telephone network 1020 to carry out the instructions.

The special treatment also may include special presentation of the future calls from the caller telephone 1005. To specially present the future calls from the caller telephone 1005, the call handling system 1025 identifies the online identity associated with the first call recipient and communicates with the online service provider system 1045 to identify an online status of the online identity. If the identity is online, the call handling system 1025 generates a message and routes the message to the online service provider system 1045. The online service provider system 1045 formats the message and sends the message to the first destination computer system 1035 corresponding to the online identity. In keeping with the previous example, where the first call recipient requests blocking future calls from the caller telephone 1005, the call handling system 1025 blocks the future call from the caller telephone 1005 and requests that the online service provider system 1045 sends a notification message to the first destination computer system 1035 indicating that the call was blocked.

The call handling system 1025 also identifies one or more user groups associated with the first call recipient (1220). In one example, the one or more user groups are identified via the UI, such as the UI 1100B of FIG. 11B. For instance, in addition to requesting special treatment for himself or herself, the first call recipient operating the first destination computer system 1035 identifies to the call handling system 1025 one or more user groups to which this indication should be applied. In a slightly different scenario, the one or more user groups may be identified based on the default setting associated with the first call recipient. In either case, the call handling system 1025 assigns the indication to the one or more identified user groups (1225) and increments the number of indications associated with the call source for each of the one or more identified user groups for which the indication has been assigned (1230). If the number of indications exceeds a threshold in one of the one or more identified user groups, the special call processing system 1025C specially treats the future calls from caller telephone 1005 for users within the one of the identified one or more user groups.

FIG. 12B illustrates an exemplary process 1200B used for specially treating calls from a call source to a call recipient based on the number of received indications corresponding to the call source from members of a user group of the call recipient. In keeping with the previous examples and for convenience, particular components described with respect to FIG. 10A are referenced as performing the process 1200B. More particularly, process 1200B is executed by a call handling system 1025 in response to instructions for specially treating calls from the caller telephone 1005 to the second call recipient based on the number of indications corresponding to the caller telephone 1005 and received from members (e.g., the first call recipient) of a user group associated with the second call recipient.

Process 1200B begins with the call handling system 1025 receiving call-related information corresponding to an incoming call from a call source (1235). As noted above with respect to FIG. 10A, the call handling system 1025 receives the call-related information from the telephone network 1020. The call handling system 1025 uses the call-related information to identify the call origin (call source) and the call destination information (1240). The call origin information includes, for example, the direct number of the caller telephone 1005 and the time and date when the call was initiated, and the call destination information includes the direct number of the second destination telephone 1015.

The call handling system 1025 identifies a user group associated with the second call recipient (1245). In one example, the call handling system 1025 accesses an account based on the received number of the second destination telephone 1015 to identify the user group of the second call recipient. After identifying the user group, the call handling system 1025, determines the number of indications corresponding to the call source and received from members of the user group (1250). The indications may reflect a desire for specially treating the calls from the caller telephone 1005. In one example, the indications may be negative, reflecting a desire to block or otherwise ignore the calls from the caller telephone 1005. Alternatively or additionally, the indications may be positive, reflecting a desire for accepting the calls from the caller telephone 1005. Alternatively or additionally, the indications may be neutral, reflecting no particular attitude toward calls from the caller telephone 1005.

The call handling system 1025 treats the call specially based on the number of received indications (1255). In particular, if the number of received indications exceeds a threshold, the call handling system 1025 specially treats the call from the caller telephone 1005. In one implementation, the call handling system 1025 only tracks the negative indications received within the one or more user groups. That is, if the number of received negative indications within one of the one or more user groups exceeds the threshold, the call handling system 1025 specially treats the call for the second call recipient. In the implementation, where the negative indications are not necessarily all the same, the call handling system 1025 may specially treat the call from the call source according to the negative treatment (e.g., blocking the call, ignoring the call, or forwarding the call to voice mail) having the highest support among all the indications. Alternatively, regardless of the type of negative treatment specified by the indication, the call handling system 1025 may treat each negative indication as a desire to block the call and accordingly blocks the call if the number of received indications passes a threshold.

In another implementation, the call handling system 1025 tracks both positive and negative indications corresponding to the caller telephone 1005 and received from the members of one or more user groups. In this implementation, the special treatment differs based on the number of positive and negative indications. For example, if the number of positive indications exceeds the number of negative indications by a threshold, then the call handling system 1025 ignores the negative indications and treats the call according to the positive indications. For instance, if the number of positive indications exceeds 100 and the number of negative indications is less than 2, then the call handling system 1025 forwards the call from the caller telephone 1005 to the second call recipient. Similarly, if the number of received indications is more than a certain threshold amount from the positive indication, the call handling system 1025 ignores the positive indications and specially treats the call according to the negative indications. As note above, in the implementation, where the negative indications are not necessarily all the same, the call handling system 1025 may specially treat the call from the call source according to the negative treatment (e.g., blocking the call, ignoring the call, or forwarding the call to voice mail) having the highest support among all the indications. Alternatively, regardless of the type of negative treatment specified by the indication, the call handling system 1025 may treat each negative indication as a desire to block the call and accordingly blocks the call if the number of received indications passes a threshold.

In a different scenario, the call handling system 1025 accumulates within each user group multiple indications based on the selection by members of the each user group of each of the different options shown in the UI 1100A. For example, a user group indicates that 200 people in the group chose to ignore the call from caller telephone 1005, 100 people in the group blocked the call from caller telephone 1005, 55 people in the group sent the call from the caller telephone to voicemail, 22 people in the group answered the call from the caller telephone 1005, and 23 people sent message to the caller telephone 1005, in response to the call. The call handling system 1025 may then determine the special treatment for the second call recipient by any combinations of the number of indications and type of indications. For example, the call handling system 1025 adds the number of the negative indications, compares it to the number of positive indications, and based on the result of comparison treats the call specially. In particular and in keeping with the above-described example, the call handling system determines that the total number of negative indications far exceeds the total number of positive indication and thus, the call handling system 1025 chooses to block the call from the caller telephone 1005. In a slightly different scenario, the call handling system 1025 presents the multiple indications to the call recipient. This allows the call recipient to perceive the different response of the members of the user's group to the caller telephone 1005 and subscribe to one of those responses. In another example, the call handling system 1025 selects the special treatment according to the type of indication having the highest number among all types of indications. In keeping with the above-described example, since the indication to ignore the call from the caller telephone 1005 has received the highest number among other indications (e.g., 200 people in the group chose to ignore the call from the caller telephone 1005), the call handling system 1025 selects to ignore the call from the caller telephone 1005. Below, process 1200B is described in more detail with respect to FIGS. 13A-13C.

Figure 13A:
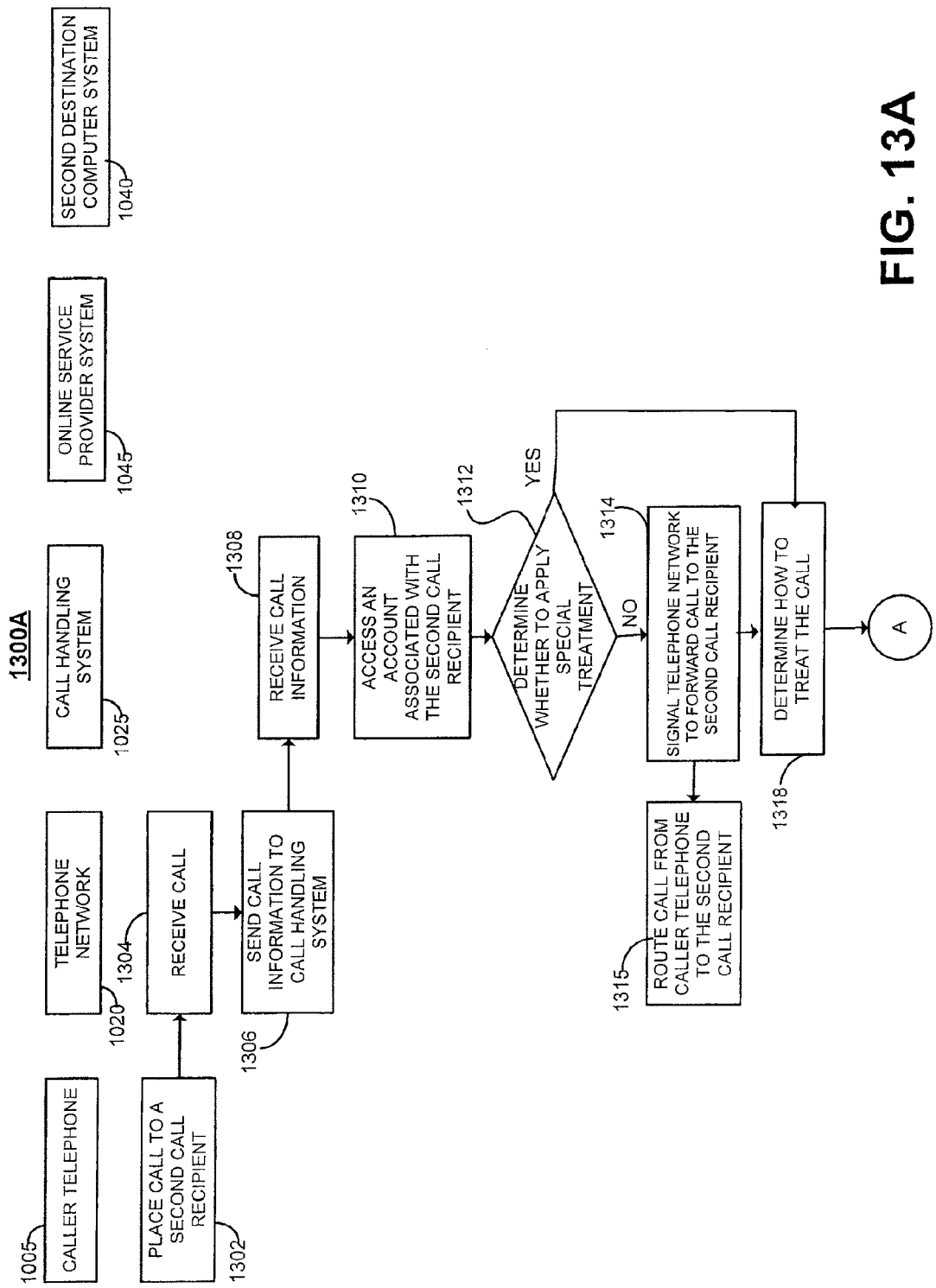
FIGS. 13A-13C illustrate a process used for treating a call to a call recipient for which calls from call sources are treated specially.
Figure 13B:
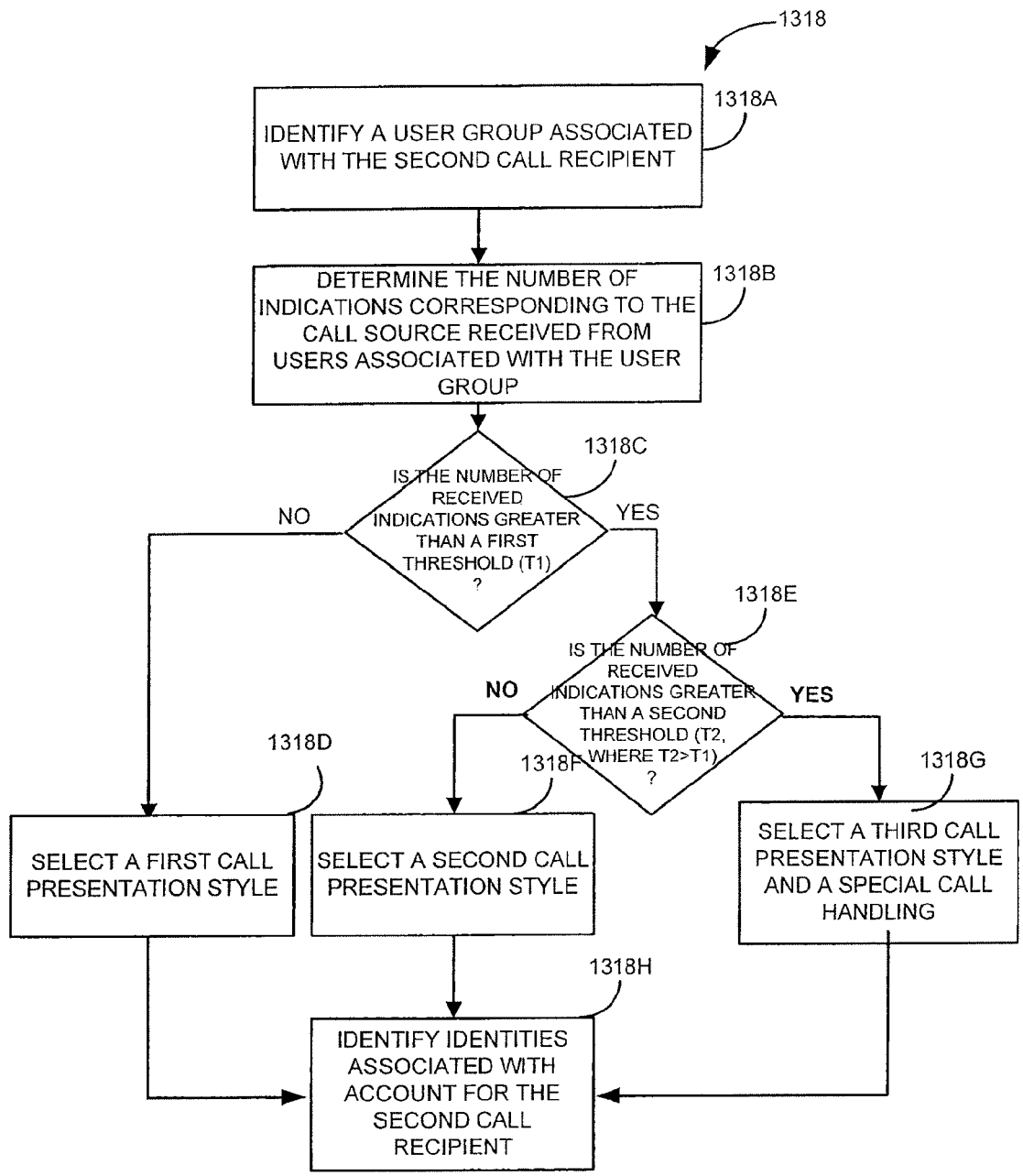
Figure 13C:
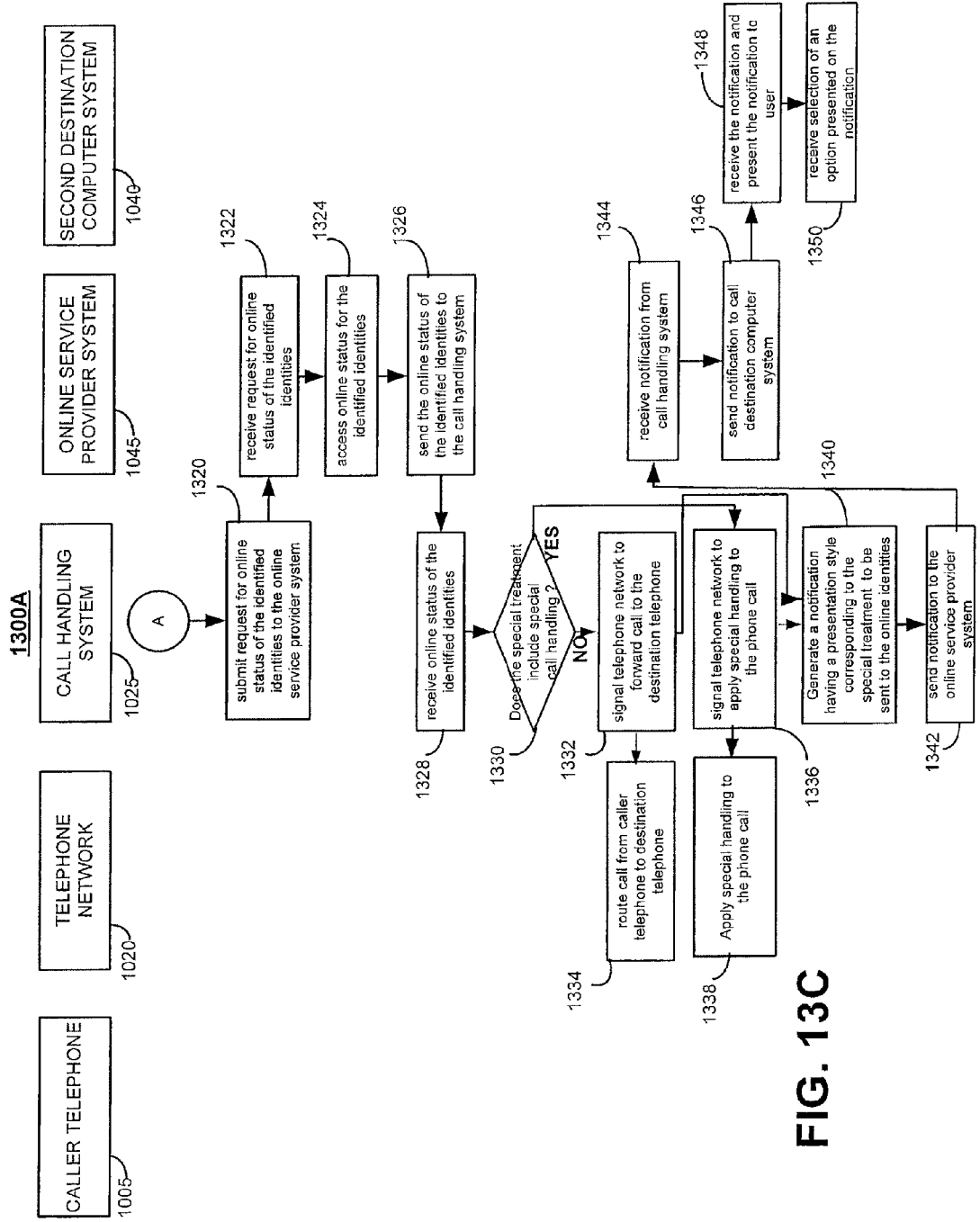

FIGS. 13A-13C describe in more detail the process 1200B illustrated by FIG. 12B. Referring to FIGS. 13A-13C, a process 1300A is used for treating a call to a call recipient for which calls from call sources are treated specially. In keeping with the previous examples and for convenience, particular components described with respect to FIG. 10A are referenced as performing the process 1300A. More particularly, the process 1300A involves a caller telephone 1005, a telephone network 1020, a call handling system 1025, an online service provider system 1045, and a second destination computer system 1040. However, similar methodologies may be applied in other implementations where different components are used to define the structure of the system, or where the functionality is distributed differently among the components shown by FIG. 10A. For example, similar methodologies may be applied in implementations where the call handling system 1025 is integrated into the online service provider system 1045.

Process 1300A begins with a user of the caller telephone 1005 placing a call to a second call recipient operating a second destination telephone 1015 by, for example, dialing the number of the second destination telephone 1015 (1302). The telephone network 1020 receives the call from the caller telephone 1005 (1304) and sends information describing the call to the call handling system 1025 (1306), which receives the call information (1308). The call information may be sent to the call handling system 1025 over a signaling channel, and may include a phone number of the destination of the call, and a time and date when the call was initiated.

The call handling system 1025 identifies and accesses an account associated with the second destination telephone 1015 (1310). The account is identified, for example, by accessing an account record stored in a configuration or registration data stored and indexed by telephone number. The call handling system 1035 determines whether special treatment is to be applied to the call (1312). The determination may be based on the accessed account. More particularly, the accessed configuration information may include preferences (e.g., preferences of the user stored in the data storage 1025B) that indicate whether special treatment should be applied to the call. Alternatively or additionally, the accessed registration information may indicate whether the destination telephone has registered for the special call treatment.

If call handling system 1025 determines that the second call recipient desire to receive no special treatment for incoming calls (1312, no), the call handling system 1025 signals the telephone network 1020 to forward the call to the second call recipient operating the second destination telephone 1015 (1314). The call handling system 1025 may send the signal over the signaling channel. In response to the signal, the telephone network 1020 routes the call from the caller telephone 1005 to the second call recipient operating the second destination telephone 1015 (1315). To do so, the telephone network 1020 may construct or redirect a voice path from the caller telephone 1005 to the second destination telephone 1015. The call handling system 1025 also may optionally signal the online service provider system 1045 to generate a notification of the incoming call to be sent to one or more online identities associated with the second call recipient. The call handling system 1025 may send the signal over the date network 1030 to the online service provider system 1045. In response to the signal, the online service provider system 1045 may generate a notification and route the notification to the online identity associated with second call recipient. In one example, the second destination computer system 1040 may correspond to one or more of the online identities. The notification may be presented via a UI, such as, for example the UI 200 or 1100A that presents the call to the second call recipient and allows the second call recipient to select from several options in handling the call as described above with respect to FIGS. 2 and 11A.

If the call handling system 1025 determines that the second call recipient desires to receive special treatment for incoming calls, the call handling system 1025 determines how to treat the call from the caller telephone 1005 for the second call recipient (1318). FIG. 13B shows an exemplary implementation of operation 1318 used to determine how to treat the call from the caller telephone 1005.

Referring to FIG. 13B, the call handling system 1025 first identifies a user group associated with the second call recipient (1318A). The call handling system 1025 may access the data storage 1025C to identify the user group associated with the second call recipient based on the personal preferences of the call recipient. In one example, the user group identifies one or more users that subscribe to the same activity as the call recipient. For example, the one or more users include coworkers of the call recipient, in which case the user group is called a work user group. In another example, the one or more users include family of the call recipient, in which case the user group is called a/family user group. In yet another example, the one or more users include friends of the call recipient, in which case the user group is called a friends user group.

Upon identification of the user group, the call handling system 1025 determines the number of received indications corresponding to the call source (e.g., the caller telephone 1005) and received from the members of the user groups (1318B). The received indications may describe a desire for special treatment of calls from the caller telephone 1005. And, based on the number of received indications, the call handling system 1025 may specially treat the call in one or more ways. In this implementation, the number of received indications correspond to negative indications (e.g., blocking the call, ignoring the call, or sending a message to the caller telephone, or any combination thereof), which are determined explicitly by the user or inferentially from user responses to a call from the call source. In another implementation, the number of received indications correspond to positive and negative indications, and/or other type of indications such as indications corresponding to each of the user options selected by the various users in the group in response to a call from the call source (e.g., an ignore indication, a block indication, an answer indication, etc.). The selection of special treatment (e.g., the selection of both presentation style and call handling) may then be determined based on the number of indications of a particular type or a combination of the number of indications of multiple different types as described more fully above with respect to FIG. 12B.

To this end, the call handling system 1025 determines whether the number of received indications (e.g., negative indications) is greater than a first threshold (1318C). If not (1318C, no), then the call handling system 1025 selects a first call presentation style and signals the online service provider system 1045 to present the call using the first call presentation style (1318D). On the other hand, if the number of received indications exceeds the first threshold (1318D, yes), the call handling system 1025 checks to determine whether the number of received indications also exceeds a second threshold (1318E). If not (1318E, no), the call handling system 1025 selects a second call presentation style and signals the online service provider system 1045 to present the call using the second call presentation style. However, if the number of received indication also exceeds the second threshold (1318E, yes), the call handling system 1025 selects a third call presentation style and a special call handling and signals the online service provider system to present the call with the third call presentation style and also signals the telephone network 1020 to handle the call according to the selected handling (1318G).

Figure 14:
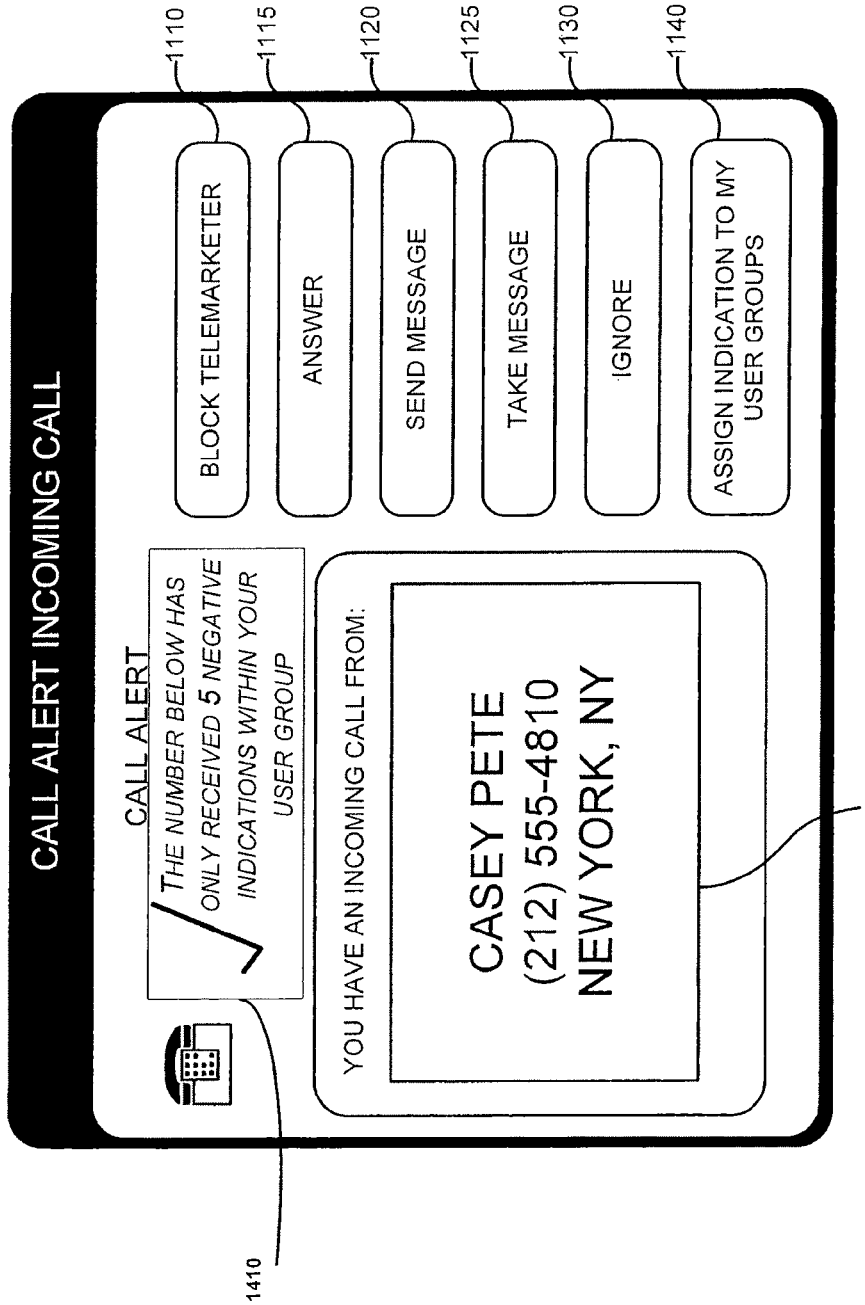
FIGS. 14-16 illustrate exemplary notification interfaces each having a particular presentation style.
Figure 15:
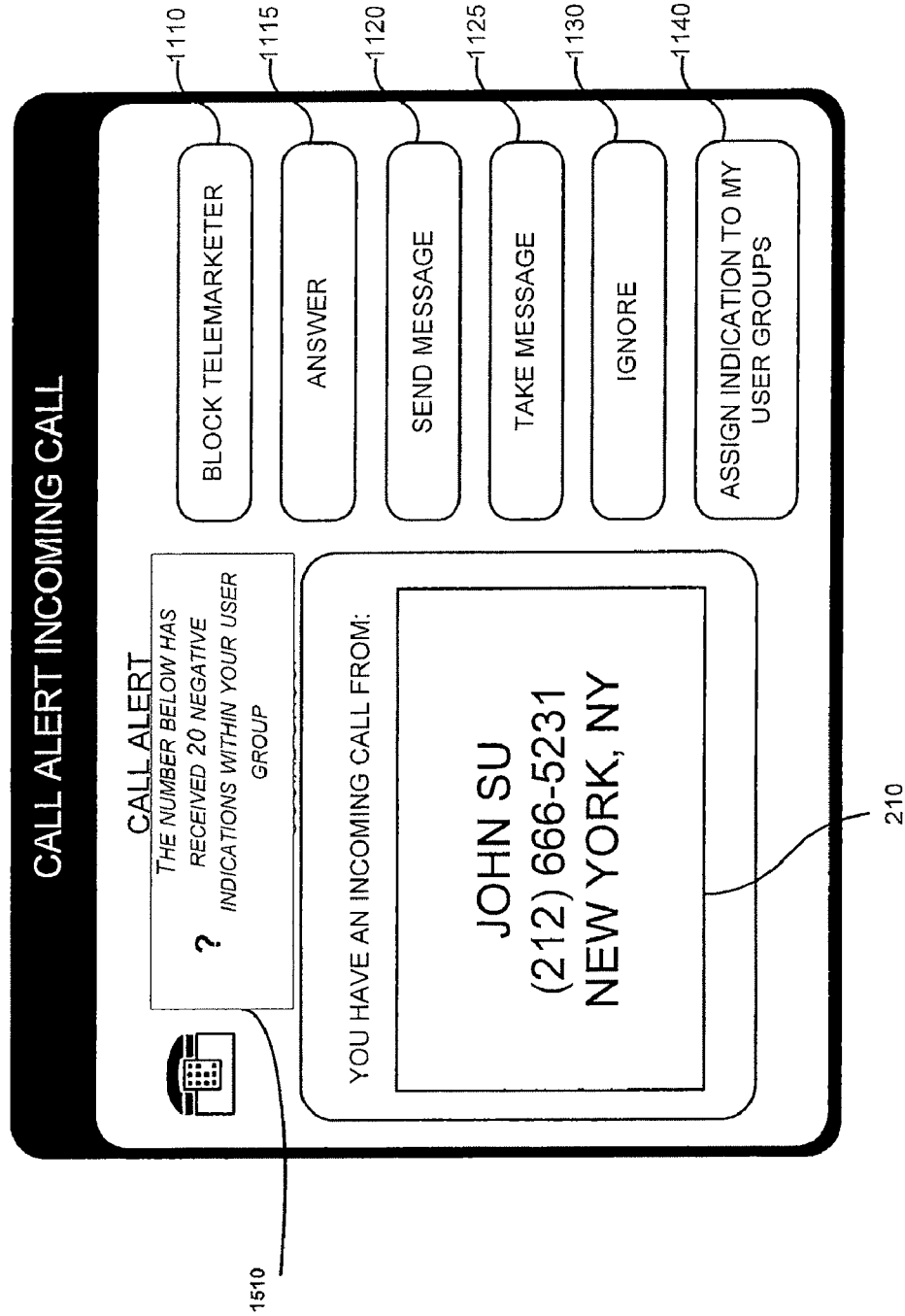
Figure 16:
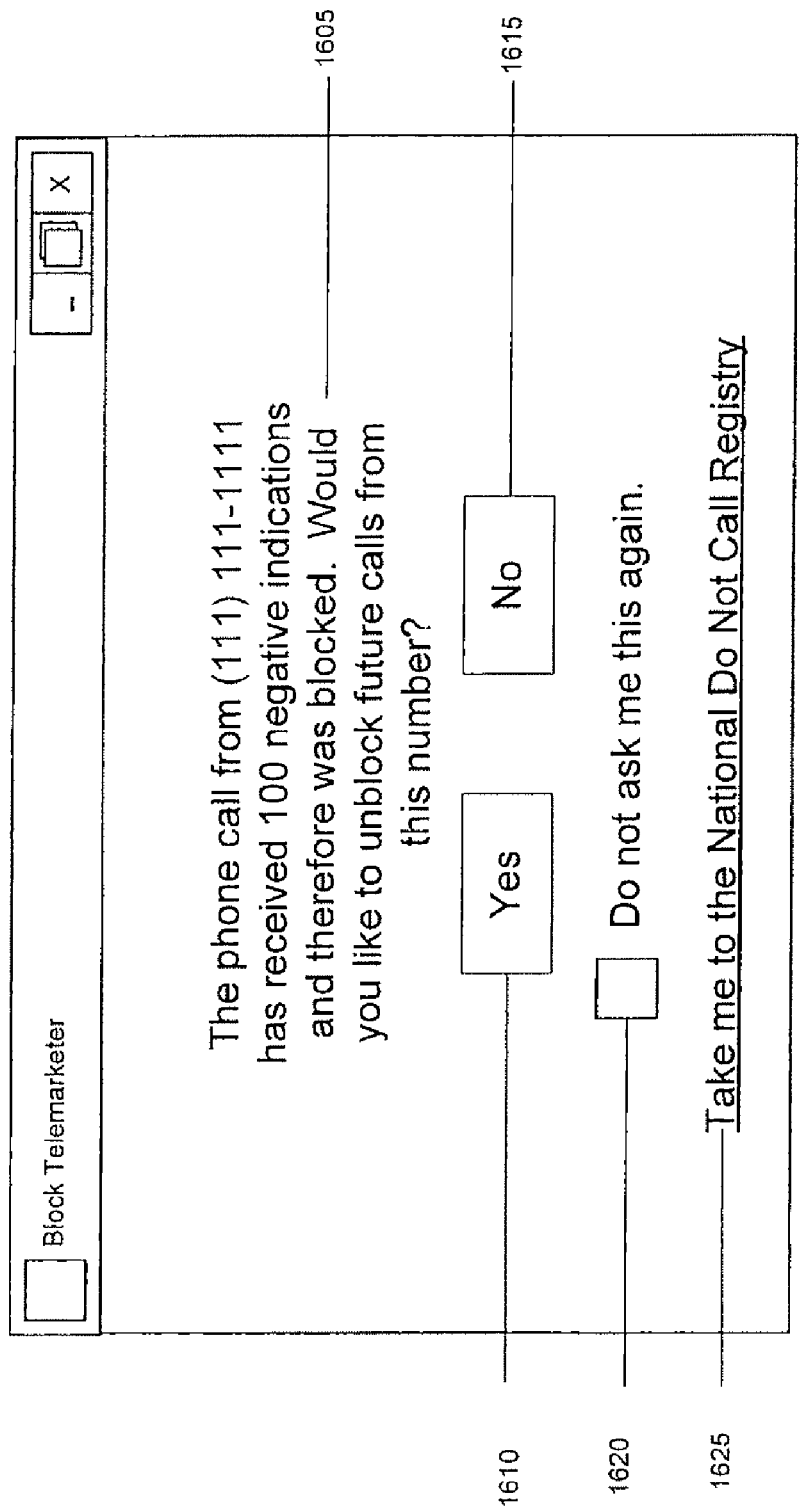

In this manner, the call handling system 1025 can present the call with three distinct presentation styles based on the number of indications/votes the call has received within the second call recipient user group. That is, if the number of indications/votes is minimal (e.g., less than the first threshold), the call handling system 1025 present the call with a first presentation style (e.g., a green color and/or a first audio sound or ring tone) that conveys this information to the second call recipient. The call notification interface 1400 illustrated in FIG. 14 and described in detail below includes an example of the first call presentation style. On the other hand, if the number of indications/votes are more than minimal but less than critical (e.g., more than first threshold but less than the second threshold), the call from the caller telephone 1005 will be presented with the second presentation style (e.g., a yellow color and/or a second audio sound or ring tone) that conveys this information to the second call recipient. The call notification interface 1500 illustrated in FIG. 15 and described in detail below includes an example of the second call presentation style. Alternatively, if the number of votes have reached a critical condition (e.g., more than the second threshold), the call from the caller telephone 1005 will be blocked and a notification message with a third presentation style (e.g., a red color and/or a third audio sound) is presented to the second call recipient to inform the second call recipient that the call was blocked. The call notification interface 1600 illustrated in FIG. 16 and described in detail below includes an example of the third call presentation style.

Accordingly, in the above implementation example shown in FIG. 13B, special treatment for the call is selected from one of three different special treatment options: (1) a first presentation style and no special handling if the number of indications does not exceed a first threshold; (2) a second presentation style and no special handling if the number of indications exceeds the first threshold but does not exceed a second threshold; and (3) a third presentation style and special handling (e.g., blocking the call) if the number of indications exceeds the second threshold.

In other implementations, the special treatment may be selected from a set of different special treatment options corresponding to different permutations of presentation styles, special handling, and thresholds. For example, the special treatment options includes more than or less than three presentation styles. The special treatment options may include multiple options having both a presentation style and special call handling. The special treatment options also may be selected based on ranges separated by more than or less than two different thresholds.

As stated previously, the special treatment also may be selected based on the number and type of indications received. The number of indications of multiple different types may be used to select the appropriate special treatment option by applying predetermined rules. Example rules may include: (1) if the number of ignore indications plus the number of block indications is greater than 300, select presentation style three and block the call; and (2) if the number of answer indications is greater than 100, irrespective of the other indications, select presentation style one and forward the call to a preferred client device.

After determining how the call should be treated, the call handling system 1025 identifies identities associated with the account for the second call recipient (1318H). In one implementation, the identities associated with the account are stored in the previously accessed account record. Returning back to process 1300A and referring to FIG. 13C, the call handling system 1025 sends a request to the online service provider system 1045 for the online status of the identified identities (1320).

The online service provider system 1045 receives the request for the online status of the identified identities (1322) and accesses the online status of the available identities (1324). The identities may include one or more electronic addresses that include a domain name. For example, the identities may have the form username@domain. For instance, user@aol.com may be an identity associated with AOL LLC® (e.g., registered with AOL), with "user" being the username and "aol.com" being the domain name. The identity may or may not be a valid e-mail address for the user of the identity. Additionally or alternatively, the identities may include one or more instant message ("IM") identifier, which may or may not be associated with a particular domain.

The online status of the identities is stored, for example, in a presence data store that is constantly updated in real-time in a manner similar to that used in instant messaging systems to reflect activity of a user at the second destination computer system 1040. The online service provider system 1045 sends the online status of the available identities to the call handling system 1025 (1326), which receives the online status of the identified identities (1328).

Then, the call handling system 1025 determines whether selected treatment in the operation block (1318) includes special handling of the call (1330). If the call handling system 1025 determines that the special treatment does not include special handling of the call (1330, no), then the call handling system 1025 signals the telephone network 1020 to forward the call to the second call recipient operating the second destination telephone 1015 (1332). In response, the telephone network 1020 routes the call from the caller telephone 1005 to the second destination telephone 1015 in the manner discussed above (1334). The call handling system 1025 may send the signal to the telephone network 1025 over the signaling channel.

If the call handling system 1025 determines that the special treatment also includes special handling of the call (1330, yes), the call handling system 1025 signals the telephone network 1020 to apply the special handling to the call (1336), and the telephone network 1020 applies the special handling (1338). The call handling system 1025 may specify the special handling by sending call handling instructions over the signaling path to the telephone network 1020, and the telephone network 1020 may process the call handling instructions to apply the special handling to the call. Applying the special handling may include constructing or redirecting a voice path from the caller telephone 1005 to the second destination telephone 1015. Alternatively, special handling may include preventing the incoming call from the caller telephone 1005 to reach the second destination telephone 1015. Alternatively, special handling may include causing the incoming call from the caller telephone 1005 to ring differently at the destination telephone 1015.

Before signaling the telephone network 1020 to forward the call or to specially treat the call (1332, 1336), the call handling system 1025 may associate additional information with the call. The call handling system 1025 also generates a notification of the special treatment to be sent to the online identities, based on the selected presentation style (1340). The generated notifications are sent to the online service provider system 1045 (1342), and the online service provider system 1045 receives the notifications from the call handling system 1025 (1344). In one example, the generated notification may be sent out in parallel with the signal sent to the telephone network 1020. The online service provider system 1045 distributes the notifications to the identified identities that were previously determined to be online. If none of the identified identities is online, then no notifications are generated.

The online service provider system 1045 sends the notifications to the call destination computer systems 135 corresponding to the online identities (1346). Prior to doing so, the online service provider system 1045 may associate format data with the notification that specifies how the notification is displayed on the second destination computer systems 1040. The sending and receiving of the notifications and format data occur in real time. The second destination computer system 1040 receives a notification and makes the notification perceivable to a user of the second destination computer system 1040 (1348). In one implementation, the second destination computer system 1040 makes the user able to perceive the notification as a pop-up window or dialog box that appears on a visual display of the second destination computer system 1040. The notification may be presented in accordance with a presentation style (which may be visual and optionally audio) corresponding to the selected special treatment. The user may select an option presented on the displayed notification, and the second destination computer system 1040 receives the selection of the option from the user (1350).

Referring again to FIG. 14, the call notification interface 1400 illustrates an example of the first presentation style and is presented to a user associated with a telephone number to which a call announced by the call notification interface 1400 was placed. The call notification interface 1400 is displayed on, for example, the second destination computer system 1040 to inform the second call recipient of the call from the caller telephone 1005. The call notification interface 1400 includes features similar to the call notification interface 1100A. In particular, the call notification interface 1400 includes caller identification information 1105, a block telemarketer option 1110, an answer option 1115, a send message option 1120, a take message option 1125, an ignore option 1130, and an assign an indication to my user groups option 1135, each of which were described in detail above with respect to the call notification interface 1100A illustrated by FIG. 11A.

The call notification interface 1400 is different from that of the notification interface 1100A in that it also includes a message 1410. The message 1410 includes a check mark near the telephone and indicates to the user that the caller telephone 1005 has only received 5 negative indications from member of the user's user group and as such seems to be from an acceptable source (e.g., not a telemarketer). The user may use this information to block, answer, or otherwise treat (e.g., ignore) the call from the caller telephone 1005. In another implementation, the message 1410 specifies the name of the user group and/or lists number of received indications corresponding to multiple different types of indications (e.g., 90 negative indications and 5 positive indications). In yet another implementation, the message 1410 includes text or a graphic displayed in a particular color corresponding to the number of received indications (e.g., green).

Referring again to FIG. 15, the call notification interface 1500 illustrates an example of a second presentation style and is presented to a user associated with a telephone number to which the call announced by the call notification interface 1500 was placed. Only the message 1510 of the call notification interface 1500 is different from the call notification interface 1400. The message 1510 includes a question mark near the telephone and indicates to the user that the caller telephone 1005 has received 20 negative indications from members of the user's user group. The user may use this information to block, answer, or otherwise treat (e.g., ignore) the call from the caller telephone.

Referring again to FIG. 16, the call notification interface 1600 illustrates an example of the third presentation style and is presented to a user associated with a telephone number to which the call announced by the call notification interface 1600 was place. The call notification interfaces includes a message 1605, an accept button 1610, a reject button 1615, an option 1620, and a link 1625. The accept button 1610, a reject button 1615, an option 1620, and a link 1625 are each configured and operate similar to the accept button 310, a reject button 315, an option 320, and a link 325 described with respect to FIG. 3, respectively, and therefore they are not described here in more detail. The message 1605 informs the second call recipient that the call was not received because the caller is believed to be a telemarketer. The message 1605 informs the user of the number of negative indications corresponding to the call source and received from the members of the user's user group. For example and as shown, the message 1605 informs the user that the call source has received 100 negative indications.

Figure 17:
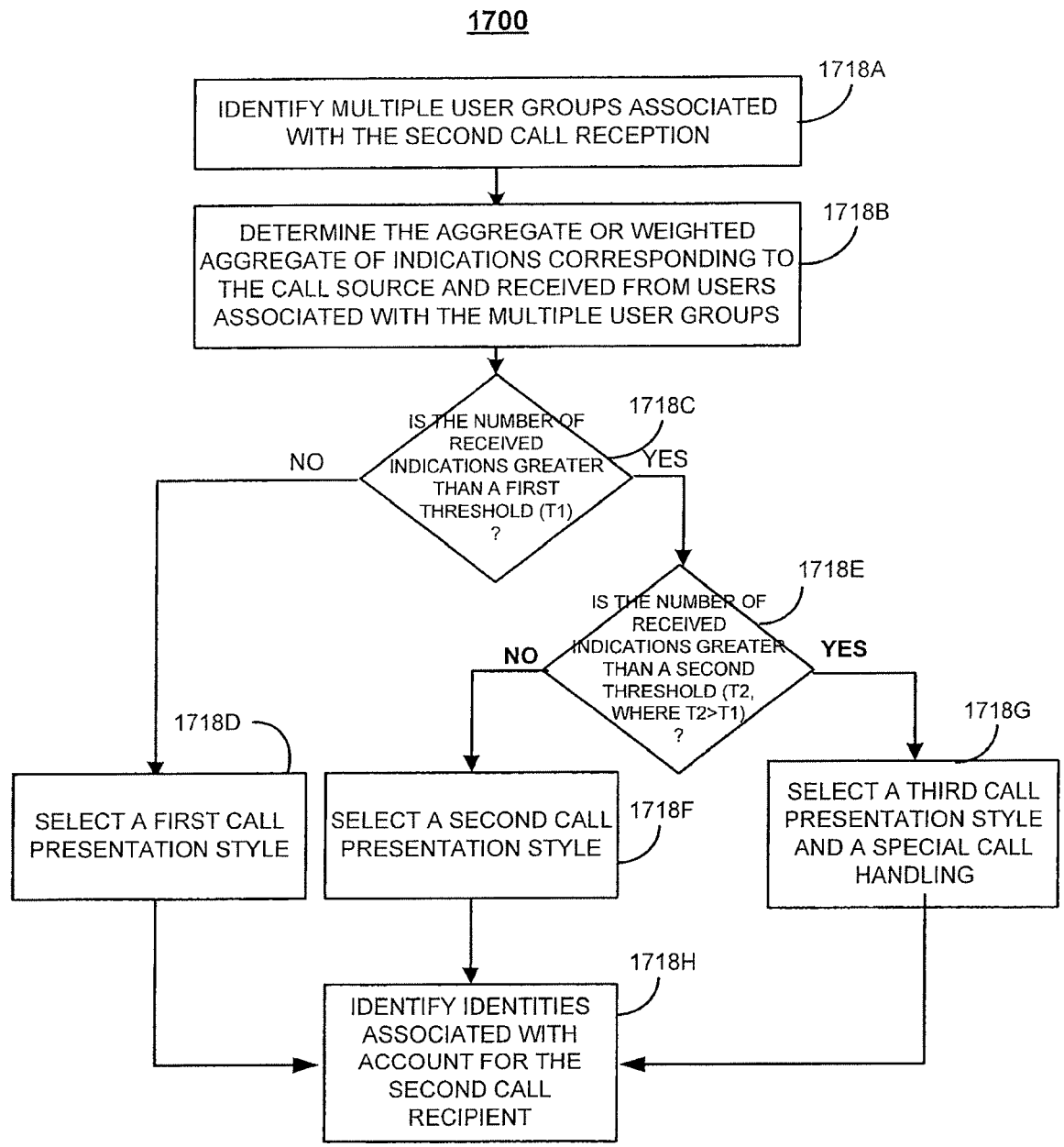
FIG. 17 illustrates an exemplary process used by a call handling system to specially treat a call from a call source based on indications received from members of multiple user groups.

Other implementations are contemplated. For example and referring to FIG. 17, instead of specially treating the call from the call source based on the indications received from members of a single user group as illustrated by FIG. 13B, the call handling system 1025 uses an exemplary process 1700 to specially treat the call from the call source based on the indications received from the members of multiple user groups.

Process 1700 begins with the call handling system 1025 identifying multiple user groups associated with the second call recipient (1718A). The call handling system 1025 may access the data storage 1025C to identify the multiple user groups associated with the second call recipient based on personal preferences of the second call recipient. Upon identification of the multiple user groups, the call handling system 1025 determines the aggregate or weighted aggregate of indications corresponding to the call source and received from the members of the multiple user groups (1718B). In one example, the call handling system 1025 determines the weight aggregate of indications if the preferences of the call recipient indicate that less weight and/or more weight should be assigned to the indications received from members of a particular user group in determining how to specially treat the call. The call handling system 1025 then performs actions (1718C to 1718H), which are similar to actions (1318C to 1318H) illustrated by FIG. 13B, to identify the special treatment based on the total number of received indications from members of the multiple user groups.

Figure 18:
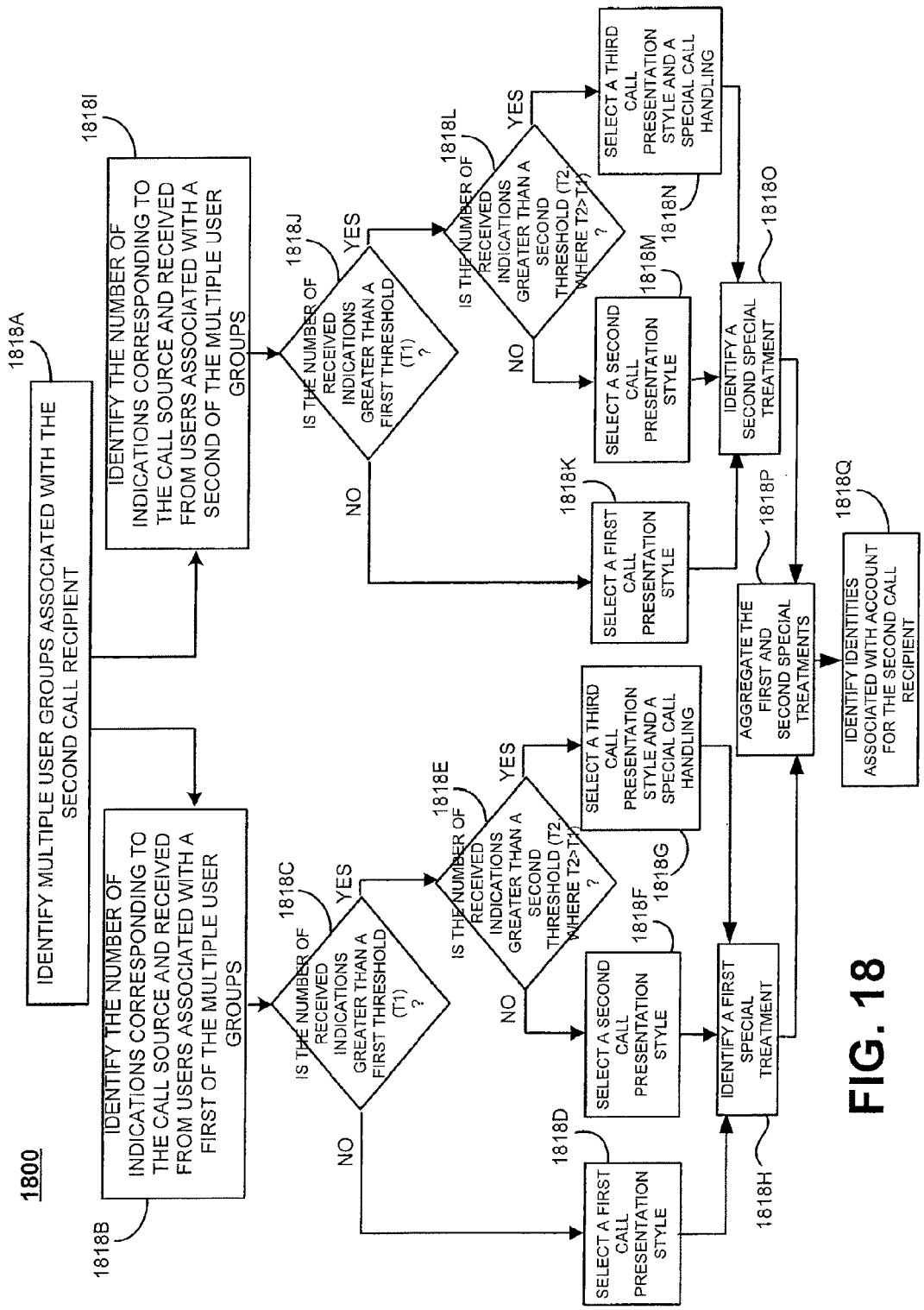
FIG. 18 illustrates an exemplary process used by a call handling system to identify multiple special treatments based on indications received from members of multiple user groups.

In another example and referring to FIG. 18, instead of specially treating the call from the call source based the indications received from members of a single user group as illustrated by FIG. 13B, the call handling system 1025 uses an exemplary process 1800 to identify multiple special treatments based on the indications received from members of multiple user groups. Process 1800 begins with the call handling system 1025 identifying the multiple user groups associated with the second call recipient (1818A). As noted above, the call handling system 1025 may access the data storage 1025C to identify the multiple user groups associated with the second call recipient based on personal preferences of the second call recipient. The multiple user groups include a first and a second user groups. The call handling system 1025 then determines the number of received indications corresponding to the call source and received from members of the first call recipient (1818B). The call handling system 1025 then performs actions (1818C to 1818G), which are similar to actions (1318C to 1318G) illustrated by FIG. 13B, to determine a first special treatment based on the number of indications received from the members of the first user group (1818H).

Similarly, the call handling system 1025 determines the number of received indications corresponding to the call source and received from members of the second user group (1818I). The call handling system 1025 then performs actions (1818) to 1818N), which are similar to actions (1318C to 1318G) illustrated by FIG. 13B, to determine a second special treatment based on the number of indications received from the member of the second user group (1818O).

The call handling system 1025 aggregates the first and second special treatments (1818P) and proceeds to identify the online identities associated with the account for the second call recipient (1818Q). As such, in this implementation, the call handling system 1025 may present a single notification interface to the user that includes a first and second presentation styles. For example, the notification interface indicates that the call source seems to be acceptable because it only has received 5 indications from members of the first user groups. In addition, the notification interface also indicates that the call source should be blocked because it has received more than a threshold amount (e.g., 100 indications) from members of the second user group. Accordingly, the notification interface generated according to this implementation allows the user to view reactions of the members of each of the multiple user groups to the call source.

Figure 19:
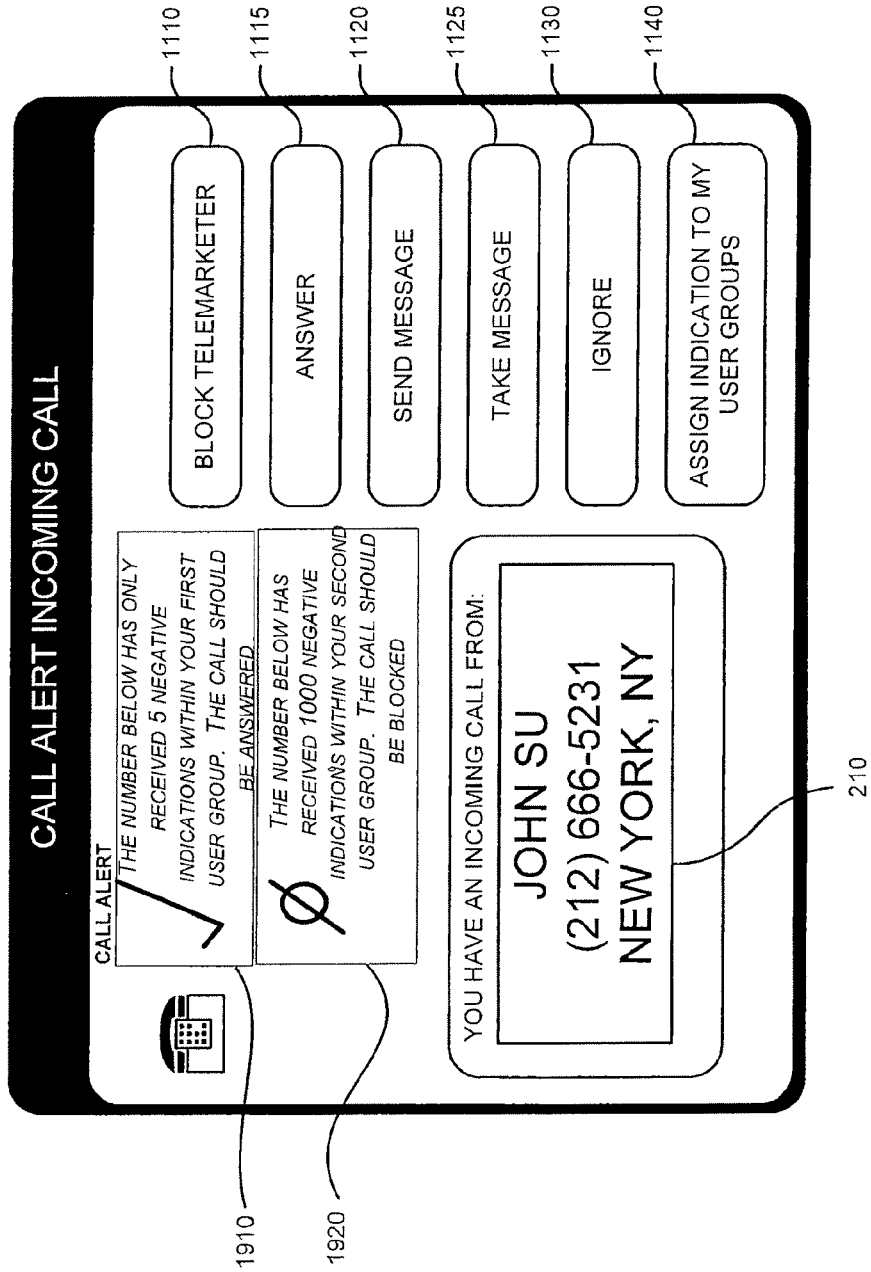
FIG. 19 illustrates an exemplary notification interface generated as a result of the process illustrated by FIG. 18.

Referring to FIG. 19, the call notification interface 1900 illustrates an example of a notification interface generated as a result of process 1800. The call notification interface 1900 includes features similar to the call notification interface 1100A. In particular, the call notification interface 1900 includes caller identification information 1105, a block telemarketer option 1110, an answer option 1115, a send message option 1120, a take message option 1125, an ignore option 1130, and an assign an indication to my user groups option 1135, each of which were described in detail above with respect to the call notification interface 1100A illustrated by FIG. 11A.

The call notification interface 1900 is different from that of the notification interface 1100A in that it also includes messages 1910 and 1920. The message 1910 indicates that the call source seems to be acceptable because it only has received 5 indications from members of the first user groups. As such, the message 1910 suggests to the call recipient to answer the call. The message 1920 indicates that the call source has received more than a threshold amount (e.g., 100 indications) from members of the second user group. As such, the message 1920 suggests to the call recipient to block the call.

Figure 20:
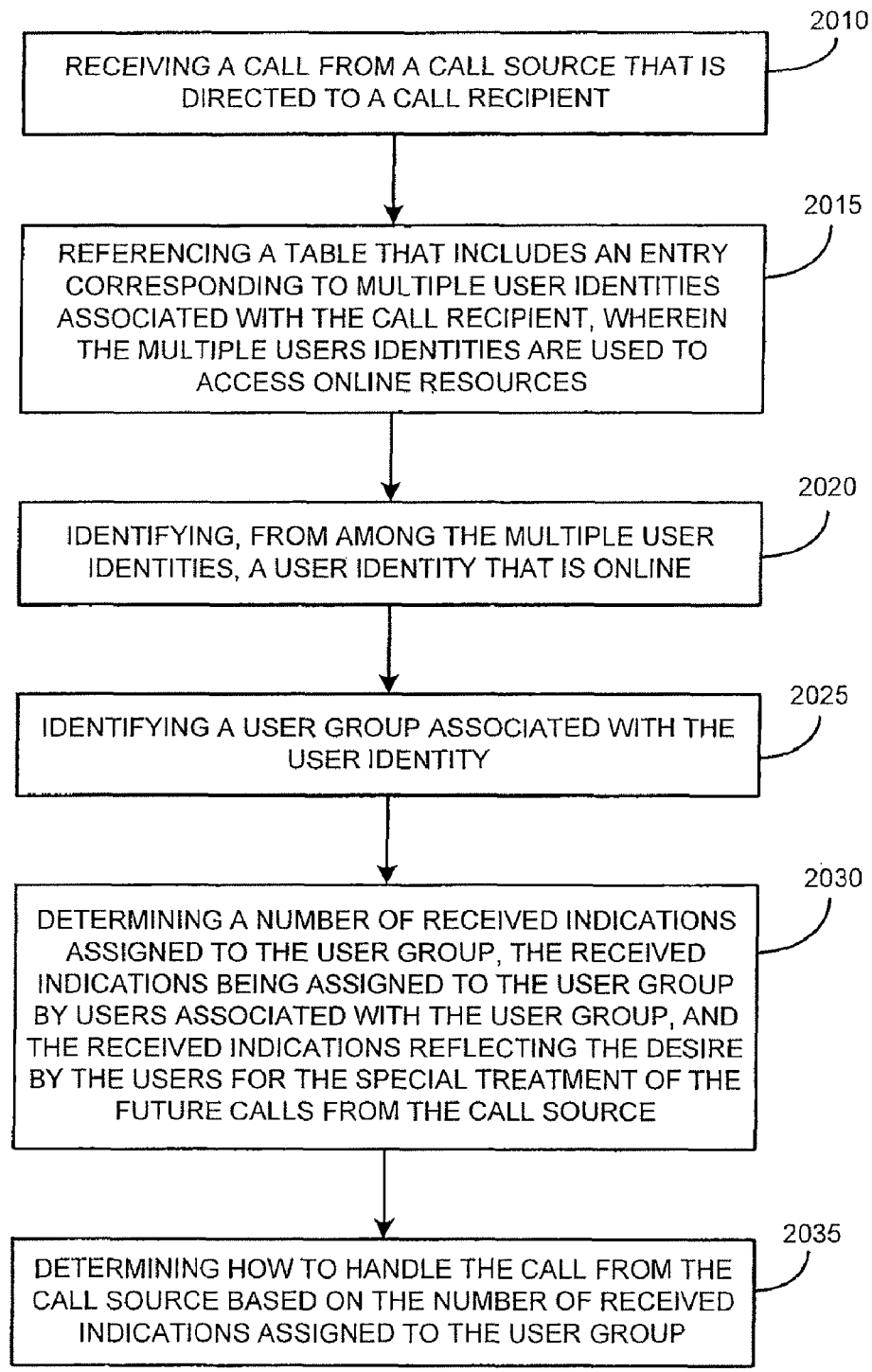
FIG. 20 illustrates an exemplary process used by a call handling system to identify an active online identity associated with a call recipient and to apply a user group filtering to a call source based on the one or more user groups associated with the active online identity.

Other implementations are contemplated. To illustrate, in one implementation, a call recipient includes multiple user identities (or online identities), and the call recipient associates each of the multiple user identities (or online identities) with a particular social group. The call recipient requests that the call handling system 1025 treat the incoming call based on users' feedback within a user group that is associated with the active user identity. As such, depending on the active user identity at a given time, the call treatment may differ for incoming calls. FIG. 20 illustrates an exemplary process 2000 used by the call handling system 1025 to identify an active user identity associated with the call recipient and to apply a user group filtering based on the one or more user groups associated with the active user identity. Process 2000 includes receiving a call from a call source that is directed to a call recipient (2010). As described above with respect to FIG. 10A, the call may be first received at the telephone network 1020, which forwards the call to the call handling system 1025. When the call is forwarded to the call handling system 1025, the telephone network 1020 is configured to send call-related information to the call handling system 1025 as well. The call related information includes the call origin and the call destination information.

The call handling system 1025 uses the call destination information to identify user identities associated with the call destination. To do so and in one specific example, the call handling system 1025 uses the call destination information to access account information associated with the call recipient and stored within its internal database. The call destination information may include a telephone number of the call recipient. The account may be associated with a table, including an entry identifying multiple user identities associated with the call recipient (2015).

The call handling system 1025 then identifies, from among the multiple user identities, a user identity that is online or otherwise active (2020). To do so, the call handling system 1025 may submit a request to the online service provider system 1045, requesting the online status for each of the multiple user identities. And, based on the response, the call handling system 1025 identifies which of the multiple user identities is online. This process is described above in detail with respect to FIG. 13C, and, as such, for purposes of brevity is not described here in more detail.

The call handling system 1025 also identifies a user group associated with the active user identity (1025). For example, the call handling system 1025 references the same table used to identify the multiple user identities to identify the user group associated with the active user identity. In particular, the table may include an additional entry that identifies the one or more user groups associated with each of the multiple user identities. The call handling system 1025 then determines a number of received indications (or votes) assigned to the user group and based on the number of received indications determines how to handle the call from the call source (1030 and 1035).

For example, assuming that the user group of the active identity includes the first user group shown in FIG. 10C, and the call source is (212) 555-4810, then the call handling system 1025 identifies that there is one received negative indication (e.g., blocking the call source) corresponding to the call source. And, the call handling system 1025 compares the number of received indication against the threshold to determine how to treat the call. For instance, if the threshold needed for a special treatment includes two and more received indications, then the call handling system 1025 does not treat the call from the call source specially and routes the call from the call source to the user.

In another example, and assuming that the user changes his or her identity, the call handling system 1025 identifies the user group associated with the changed user identity. For instance, assuming that the user group associated with the changed user identity includes the second user group shown in FIG. 10C, and the call source is (212) 555-4810, the call handling system 1025 identifies that there is two received negative indications corresponding to the call source. As such, the call handling system 1025 treats the call from the call source specially. To this end, the call handling system 1025 may block the call from the call source according to one of the received indications or may alternatively ignore the call from the call source according to the other received indication. Additionally or alternatively, the call handling system 1025 may present the different treatments suggested by the votes to the call recipient, thereby allowing the call recipient to choose from among the different alternatives.

By monitoring the status of the multiple user identities, the call handling system 1025 recognizes when the call recipient switches from a first of multiple user identities to a second of multiple user identities. Upon such recognition, the call handling system 1025 continues actions (1025-1035) to handle incoming calls based on the user group associated with the second user identity. In this manner, the call handling system 1025 selectively filters incoming calls based on the user identity the call recipient actively uses to access online resources.

In another implementation, a call handling system 1025 provides a call recipient with an option to opt-in or opt-out of user groups for purposes of special treatment of incoming calls. In particular, the call handling system 1025 presents a user interface to the call recipient that allows the call recipient to indicate which one of the user groups of the call recipient should be used for the purposes of specially treating calls from caller telephone 1005. In one specific example, the call recipient indicates that only family group's indications should dictate special treatment of incomings calls. Alternatively, the call recipient may indicate that only coworker group's indications should be used in influencing the special treatment of incoming calls. In yet another example, the call recipient indicates that all user group's indications should be used in influencing the special treatment of incoming calls.

In another implementation, the call handling system 1025 takes into account personal preferences of the call recipient, and, based on the personal preferences, the call handling system 1025 overrides the special treatment suggested by the users within a user group of the call recipient. For example, if the personal preference of the call recipient indicates that a particular call from a call source is acceptable, the call handling system 1025 routes the call to the call recipient, regardless of received negative indications, from users within call recipient's user group, suggesting that the call should be, for example, blocked. Additionally or alternatively, the call handling system 1025 may route the call to the call recipient and may inform the call recipient that the users within the call recipient's user group have indicated a different treatment for the call.

In another implementation and similar to the implementation described above, the call handling system 1025 monitors call history (instead or in addition to the personal profile) of the call recipient, and, based on the call history, the call handling system 1025 overrides the special treatment suggested by the users within the call recipient's user group. In keeping with the above-described example, if the call history suggests a call from a call source is acceptable, the call handling system 1025 routes the call from the call source to the call recipient, regardless of the received negative indications associated with the call, suggesting that the call should be for example blocked. Additionally or alternatively, the call handling system 1025 may present the call recipient with two options: (1) option to answer the call based on the call recipient's pass receptiveness to the call; and (2) specially treat the call according to the received indications from users within the user group of the call recipient.

In another implementation, a call recipient instructs the call handling system to specially treat calls from a call source based on rules other than the number of votes and/or indications associated with the call source. In one example, the call recipient instructs the call handling system to specially treat calls from a call source associated with a particular user group. In another example, the call recipient instructs the call handling system to specially treat calls from a call source associated with an institution that fails to meet certain market standards (e.g. market ratings). As such, in these scenarios, as long as the criteria associated with the call source meets the designated rules, the calls from the call source are treated specially regardless of the number of votes and/or indications associated with the call source.

To illustrate, in a scenario where a call recipient indicates that a call from a bank should be accepted if the bank is among the top ten banking institutions, the call handling system monitors and back track calls directed to the call recipient to identify the entity with which the call source is registered. Upon identifying the entity and realizing that it is a banking entity, the call handling system references a rating table to determine whether the bank appears among the top ten banking institutions. If so, the call handling system allows the call from the call source to reach the call recipient. Otherwise, the call handling system blocks the call or otherwise specially treats the call from the call source.

To specially treat calls from a call source, in another implementation, other criteria may be used in addition to or instead of the user group and/or the number of votes associated with the call source. For example, the call recipient can designate rules for specially treating calls from call sources that are from certain geographic locations and/or belong to a certain domain. In one specific example, the call recipient instructs the call handling system to specially treat (e.g., block) calls from state of Nevada. In this scenario, the call handing system references the area code associated with call sources and treats specially (e.g., blocks) calls from the call sources having Nevada area code.

Although in the implementations illustrated above, the call notifications are in the form of user interfaces, other forms of call notifications are contemplated. For example, the call notification may be made through audio instant messengers including several different tones for different treatments (e.g., one tone designated for calls that should be blocked, another tone designated for calls that should be ignored, and another tone designated for calls that should be answered). Additionally or alternatively, the call notifications may be made in the form of video animation or other graphical expressions that may be displayed on the call recipient's computer or mobile device. For example, a trash can animation may be associated with a call that should be blocked and the animation is played on the call recipient's computer when the call recipient receives such calls.

What is claimed is:

1. A method comprising:
receiving at least one indication from a first electronic communication recipient reflecting a characterization of at least one electronic communication from an electronic communication source;
identifying, by at least one processor, one or more online groups associated with the first recipient based on at least the first recipient's interaction with the one or more online groups;
associating the indication with at least one group from among the one or more online groups;
determining, by the at least one processor, a number of received indications related to the electronic communication source associated with the at least one group, the received indications being associated to the group by the recipients associated within the group, the received indications reflecting the recipients characterization of the electronic communications source; and
filtering, by the at least one processor, a plurality of electronic communications from a source based on at least the number of received indications related to the source.

2. The method of claim 1, wherein the characterization of the at least one electronic communication comprises at least an indication by the first recipient of a desire to apply special treatment to future electronic communications from the source.

3. The method of claim 1, wherein:
receiving the indication from the first recipient includes receiving a vote from the first recipient, the vote reflecting a desire to block future electronic communication from the source;
determining the number of received indications includes referencing a table to determine a number of received votes related to the source and assigned to the at least one group, the received votes being assigned to the at least one group by users associated with the at least one group and the received votes reflecting the desire by the users to block future electronic communications from the source; and
filtering the plurality of electronic communication from the source includes:
determining whether the number of received votes assigned to the at least one group exceeds a threshold; and
blocking the incoming electronic communication from the source to a second electronic communication recipient associated with the at least one group if it is determined the number of received votes assigned to the at least one online group exceeds the threshold.

4. The method of claim 3, further comprising informing the second recipient that the incoming electronic communication from the source was blocked.

5. The method of claim 1, wherein the first recipient is different from the second recipient.

6. The method of claim 1, wherein the second recipient is different from the users who have assigned the indications to the at least one group.

7. The method of claim 1, wherein associating the indication to the one or more online groups includes selectively assigning the indication to the one or more online groups of the first recipient based on preferences of the first recipient.

8. The method of claim 7, wherein selectively assigning the indication to the one or more online groups of the first recipient based on the preferences of the first recipient comprises:
  presenting a user interface to the first recipient, the user interface including an option allowing the first recipient to select the one or more online groups; and
  obtaining feedback from the first recipient, the feedback identifying the one or more online groups.

9. The method of claim 7, wherein selectively assigning the indication to the one or more online groups of the first recipient based on the preferences of the first recipient includes assigning the indication to all of the one or more online groups of the first recipient.

10. The method of claim 7, wherein selectively assigning the indication to the one or more online groups of the first recipient based on the preferences of the first recipient includes assigning the indication to a subset of all online groups of the recipient.

11. The method of claim 1, wherein selectively assigning the indication to the one or more online groups includes selectively assigning the indication to the one or more online groups based on a default setting, wherein the default setting comprises at least one of a default setting selected by the first recipient or a default setting selected by a host system.

12. The method of claim 1, wherein filtering the plurality of electronic communications from the source comprises:
  determining whether the number of received indications assigned to the at least one group exceeds a threshold; and
  wherein filtering the plurality of electronic communications based on whether the number of received indications associated with the at least one group is determined to exceed the threshold.

13. The method of claim 12, further comprising preventing an incoming electronic communication from the source to reach the second recipient.

14. The method of claim 13, further comprising allowing the incoming electronic communication to reach the second recipient if the number of received indications associated with the at least one group is less than or equal to the threshold.

15. The method of claim 1, further comprising:
  identifying a plurality of online groups associated with a second recipient;
  determining a number of received indications associated with each of the plurality of groups by users associated with the plurality of online groups reflecting the users' characterizations of the electronic communications from the source; and
  filtering a plurality of electronic communications to the second recipient based on the number of received indications assigned to the plurality of online groups.

16. The method of claim 15, wherein filtering a plurality of electronic communications to the second recipient comprises:
  identifying preferences of the second recipient associated with assigning less weight to the indications from the users associated with a first online group; and
  applying the identified preferences against the received indications includes assigning less weight to the indications from the users associated with the first user.

17. The method of claim 1, further comprising:
  determining a plurality of identities associated with the first recipient, wherein each of the plurality of identities is associated with a set of preferences;
  determining an active identity of the first recipient; and
  filtering a plurality of electronic communications from the source based on preferences associated with the active identity.

18. The method of claim 17, wherein the active identity comprises an identity used to log the first recipient into a host system.

19. The method of claim 1, wherein identifying the one or more online groups comprises:
  presenting a user interface to the first recipient, the user interface comprising an option allowing the first recipient to provide information regarding a plurality of online groups; and
  receiving feedback from the first recipient identifying the one or more online groups.

20. The method of claim 1, wherein filtering the plurality of electronic contention comprises:
  determining how to handle the incoming electronic communications from the source based on the received indications associated with the at least one group, wherein a subset of the received indications are directly associated with the source.

21. A non-transitory computer-readable storage medium including instructions for processing electronic communications, the instructions being executable by at least one processor to cause the processor to perform steps comprising:
  receiving at least one indication from a first electronic communication recipient reflecting a characterization of at least one electronic communication from an electronic communication source;
  identifying, by at least one processor, one or more online groups associated with the first recipient based on at least the first recipient's interaction with the one or more online groups;
  associating the indication, by the at least one processor, with at least one group from among the one or more online groups;
  determining, by the at least one processor, a number of received indications related to the electronic communication source associated with the at least one group, the received indications being associated to the group by the recipients associated within the group, the received indications reflecting the recipients characterization of the electronic communications source; and
  filtering, by the at least one processor, a plurality of electronic communications from a source based on at least the number of received indications related to the source.

22. The computer-readable storage medium of claim 21, wherein associating the indication to the one or more online groups includes selectively assigning the indication to the one or more online groups of the first recipient based on preferences of the first recipient.

23. The computer-readable storage medium of claim 22, wherein selectively assigning the indication to the one or more online groups of the first recipient based on the preferences of the first recipient comprises:
  presenting a user interface to the first recipient, the user interface including an option allowing the first recipient to select the one or more online groups; and
  obtaining feedback from the first recipient, the feedback identifying the one or more online groups.

24. The computer-readable storage medium of claim 23, wherein selectively assigning the indication to the one or more online groups of the first recipient based on the preferences of the first recipient includes assigning the indication to all of the one or more online groups of the first recipient.

25. The computer-readable storage medium of claim 23, wherein selectively assigning the indication to the one or more online groups of the first recipient based on the preferences of the first recipient includes assigning the indication to a subset of all online groups of the recipient.

* * * * *